(12) United States Patent
Etter et al.

(10) Patent No.: US 9,123,009 B1
(45) Date of Patent: *Sep. 1, 2015

(54) EQUITABLE SHIFT ROTATION AND EFFICIENT ASSIGNMENT MECHANISMS FOR CONTACT CENTER AGENTS

(71) Applicant: Noble Systems Corporation, Atlanta, GA (US)

(72) Inventors: Thomas J. Etter, Alpharetta, GA (US); Karl H. Koster, Sandy Springs, GA (US); Deena S. Etter, Alpharetta, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/632,199

(22) Filed: Feb. 26, 2015

(51) Int. Cl.
H04M 3/51 (2006.01)
G06Q 10/06 (2012.01)

(52) U.S. Cl.
CPC .............................. G06Q 10/063116 (2013.01)

(58) Field of Classification Search
CPC ............... G06Q 10/06311; G06Q 10/063116; H04M 3/5175; H04M 2203/402
USPC .............. 379/265.04–265.06; 705/7.12, 7.13, 705/7.14, 7.16, 7.18
See application file for complete search history.

(56) References Cited

U.S. PATENT DOCUMENTS

| | | | |
|---|---|---|---|
| 6,005,932 A | 12/1999 | Bloom | |
| 8,644,489 B1 | 2/2014 | Noble, Jr. et al. | |
| 2005/0004825 A1 | 1/2005 | Ehrler et al. | |
| 2005/0080658 A1 | 4/2005 | Kohn et al. | |
| 2006/0200008 A1 | 9/2006 | Moore-Ede | |
| 2007/0198325 A1 | 8/2007 | Lyerly | |
| 2008/0300955 A1 | 12/2008 | Hamilton et al. | |
| 2010/0017251 A1 | 1/2010 | Rawle et al. | |
| 2012/0316907 A1 | 12/2012 | Nimmagadda | |

OTHER PUBLICATIONS

IEX Corporation, TotalView WebStation, Release 3.7, Document No. 1-602-660, Jun. 2004.

Noble Systems Corporation, ShiftTrack Agent Client User Manual Version 5.6, Nov. 2011, 23 Pages, Noble Systems Corporation, Atlanta, GA 30319.

Noble Systems Corporation, ShiftTrack Plus User Manual 5.5.0, Jun. 2010, 1281 pages.

Noble Systems Corporation, ShiftTrack Plus User Manual Version 5.6, Mar. 2012, 1350 Pages.

Noble Systems Corporation, NobleWFM 2010.1.0 User Guide, Mar. 28, 2011, 324 pages, Atlanta, GA.

*Primary Examiner* — Harry S Hong

(57) ABSTRACT

Systems and methods are provided for facilitating equitable assignment of rotating shifts to agents in a contact center. In one embodiment, points are allocated to agents indicating their frequency of receiving undesirable shift assignments. Based on the previously allocated points, future undesirable shifts are assigned to agents. The point allocation scheme accommodates various exceptions scheduling periodic rotating shifts, such as skipping assignment of an agent from an upcoming undesirable shift, agents leaving, swapping a shift, and agents being added. In another embodiments, agents are assigned to rotating shifts using constructs of a cycle and a rotation template, which facilitates assigning agents to a work schedule with a calendar in a repetitious manner, and where certain shifts are non-rotational in nature and other shifts are rotational in nature.

22 Claims, 19 Drawing Sheets

| Agent\Day | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|
| 1 | -3 | -4 | -5 | -4 | -5 | -6 | -7 | -6 | -7 | -8 | -7 | -8 | -9 | -10 | -11 | -10 |
| 2 | -3 | -4 | -5 | -6 | -5 | -6 | -7 | -6 | -7 | -8 | -9 | -8 | -9 | -10 | -11 | -10 |
| 3 | -4 | -3 | -4 | -5 | -4 | -5 | -6 | -7 | -6 | -7 | -8 | -7 | -8 | -9 | -10 | -11 |
| 4 | -4 | -3 | -4 | -5 | -6 | -5 | -6 | -7 | -6 | -7 | -8 | -9 | -8 | -9 | -10 | -11 |
| 5 | -4 | -5 | -4 | -5 | -6 | -5 | -6 | -7 | -8 | -7 | -8 | -9 | -10 | -9 | -10 | -11 |
| 6 | -4 | -5 | -4 | -5 | -6 | -7 | -6 | -7 | -8 | -7 | -8 | -9 | -10 | -9 | -10 | -11 |
| 7 | -4 | -5 | -6 | -5 | -6 | -7 | -6 | -7 | -8 | -9 | -8 | -9 | -10 | -11 | -10 | -11 |
| 8 |   |   |   | -1 | -2 | -3 | -4 | -5 | -6 | -7 | -8 | -9 | -10 | -11 | -10 | -11 |
| 9 |   |   |   | -1 | -2 | -3 | -4 | -5 | -6 | -7 | -8 | -9 | -10 | -11 | -10 | -11 |

FIG. 9B

| Agent\Day | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|
| 1 | -3 | -4 | -5 | -4 | -5 | -6 | -7 | -6 | -7 | -8 | -9 | -8 | -9 | -10 | -11 | -12 | -11 | -12 | -13 | -14 | -15 |
| 2 | -3 | -4 | -5 | -6 | -5 | -6 | -7 | -6 | -7 | -8 | -9 | -10 | -9 | -10 | -11 | -12 | -11 | -12 | -13 | -14 | -15 |
| 3 | -4 | -3 | -4 | -5 | -4 | -5 | -6 | -7 | -8 | -7 | -8 | -9 | -10 | -9 | -10 | -11 | -12 | -13 | -12 | -13 | -14 |
| 4 | -4 | -3 | -4 | -5 | -6 | -5 | -6 | -7 | -8 | -7 | -8 | -9 | -10 | -11 | -10 | -11 | -12 | -13 | -12 | -13 | -14 |
| 5 | -4 | -5 | -4 | -5 | -6 | -7 | -6 | -7 | -8 | -9 | -8 | -9 | -10 | -11 | -12 | -11 | -12 | -13 | -14 | -13 | -14 |
| 6 | -4 | -5 | -6 | -5 | -6 | -7 | -6 | -7 | -8 | -9 | -8 | -9 | -10 | -11 | -12 | -13 | -12 | -13 | -14 | -15 | -14 |
| 7 | -4 | -5 | -6 | -5 | -6 | -7 | -8 | -7 | -8 | -9 | -10 | -9 | -10 | -11 | -12 | -13 | -12 | -13 | -14 | -15 | -14 |
| 8 |   |   | -4 | -5 | -6 | -7 | -7 | -8 | -8 | -8 | -9 | -10 | -10 | -10 | -11 | -12 | -13 | -13 | -13 | -14 | -15 |
| 9 |   |   | -4 | -5 | -6 | -6 | -7 | -8 | -8 | -8 | -9 | -10 | -10 | -10 | -11 | -12 | -13 | -13 | -13 | -14 | -15 |

| Agent | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|
| 1 | -3 | -4 | -5 | -6 | -5 | -6 | -7 | -8 | -9 | -8 | -9 | -10 | -11 | -10 | -11 | -12 |
| 2 | -3 | -4 | -5 | -6 | -7 | -6 | -7 | -8 | -9 | -8 | -9 | -10 | -11 | -12 | -11 | -12 |
| 3 | -4 | -3 | -4 | -5 | -6 | -7 | -6 | -7 | -8 | -9 | -8 | -9 | -10 | -11 | -12 | -11 |
| 4 | -4 | -3 | -4 | -5 | -6 | -7 | -6 | -7 | -8 | -9 | -10 | -9 | -10 | -11 | -12 | -11 |
| 5 | -4 | -5 | -4 | -5 | -6 | -7 | -8 | -7 | -8 | -9 | -10 | -11 | -10 | -11 | -12 | -13 |
| 6 | -4 | -5 | -4 | -5 | -6 | -7 | -8 | -7 | -8 | -9 | -10 | -11 | -10 | -11 | -12 | -13 |
| 7 | -4 | -5 | -6 | -5 | -6 | -7 | -8 | -9 | -8 | -9 | -10 | -11 | -12 | -11 | -12 | -13 |
| 8 | -4 | -5 | -6 | -7 | -6 | -7 | -8 | -9 | -8 | -9 | -10 | -11 | -10 | -11 | -12 | -13 |
| 9 | -4 | -5 | -7 | -6 | -7 | -6 | -7 | -8 | -9 | -10 | -9 | -10 | -11 | -12 | -11 | -12 |

FIG. 9E

EQUITABLE SHIFT ROTATION AND EFFICIENT ASSIGNMENT MECHANISMS FOR CONTACT CENTER AGENTS

BACKGROUND

Contact centers typically employ a number of agents to handle calls throughout a scheduling period. Depending on the purpose of the contact center, agents may be staffed twenty four hours a day, seven days a week ("24/7"), or a portion thereof. A common staffing arrangement involves scheduling a group of agents during each weekday with reduced staff working on the weekend. Thus, the contact center may have one or two day shifts during the week and a single shift on the weekend. Frequently, the weekend shift is staffed by rotating subset of the agents that work during the week.

There are different types of shifts and arrangements for scheduling agents. This could include a day shift, evening shift, night shift, and weekend shift. There may be some agents that prefer evening or weekend shifts and scheduling these agents for such times may avoid hardship for other agents. However, agents often prefer working a day shift, and may find it less desirable to work evening, night or weekend shifts. Given a set of scheduling requirements, accommodating the preferences of all the agents in a contact center can be challenging and in many cases, it is simply not possible to appease the desires of all the agents. Thus, scheduling a group of agents to meet the required operational requirements frequently involves a compromise among the agents and administrators. Typically, agents will agree to periodically work the undesirable work schedules so long as no one agent, or set of agents, is unfairly burdened.

Establishing an initial schedule of rotating shifts to cover the operational requirements of the contact center can be a challenge by itself, but it is further complicated by changes that may be occur after a recurring schedule is established. It can be expected that agents may become sick, fail to show up for work during their scheduled shift, require time off for doctor's appointments or family-related functions, take scheduled vacations, etc. Additionally, agents may quit or may be terminated, and new agents may be hired as replacements. Each of these events may disturb an established schedule and changes have to be equitably handled by the contact center administrator.

Further, assignment of agents to such schedules should be done easily and changes should involve minimal time by the administrator. It is preferred to avoid having the administrator manually re-enter each agent's information or rebuild an entirely new schedule each time a single change is made to a schedule involving a set of agents.

Thus, it would be desirable to provide an automated system for easy and equitable distribution of work schedules that also accommodates various types of exceptions and changes thereto. The automated system should easily accommodate establishing and changing a schedule, all the while ensuring that that schedule changes are performed equitably among the various agents. It is with respect to these and other considerations that the disclosure herein is presented.

BRIEF SUMMARY

In general, embodiments of the present invention provides computer program products, methods, systems, apparatus, and computing entities for generating and modifying work shifts for agents in a contact center in an equitable manner. Different shifts may be grouped into a cycle, and multiple cycles can be associated with a roster template. The roster template, in turn, may be associated with specific calendar days for a scheduling period. Assignment of an agent to a cycle/roster template/calendar can facilitate scheduling the agent for repetitive schedules. Further, using cycles for rotating shifts can also facilitate scheduling agents for periodic schedules. In one embodiment, a point allocation scheme may be used to assign points to shift in a cycle to reflect the relatively desirability among workers to be assigned to that shift, so that shifts in a rotating cycle can be equitably distributed. In one embodiment, information is received regarding when an agent logs into and out of a call handler and this information is compared against a schedule generated for that agent. In one embodiment, the agent may be authorized to denied the ability to login based on the work schedule. If the agent is authorized to login based on the work schedule, then the call handler will direct an instance of communication to the agent to handle.

As is discussed in greater detail below, the subject matter disclosed herein may be implemented as a computer-controlled apparatus, a method, a computing system, or as an article of manufacture such as a tangible, non-transitory computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein:

FIGS. 8 and 9A-9E illustrate various scheduling point tables.

DETAILED DESCRIPTION

Figure 1:
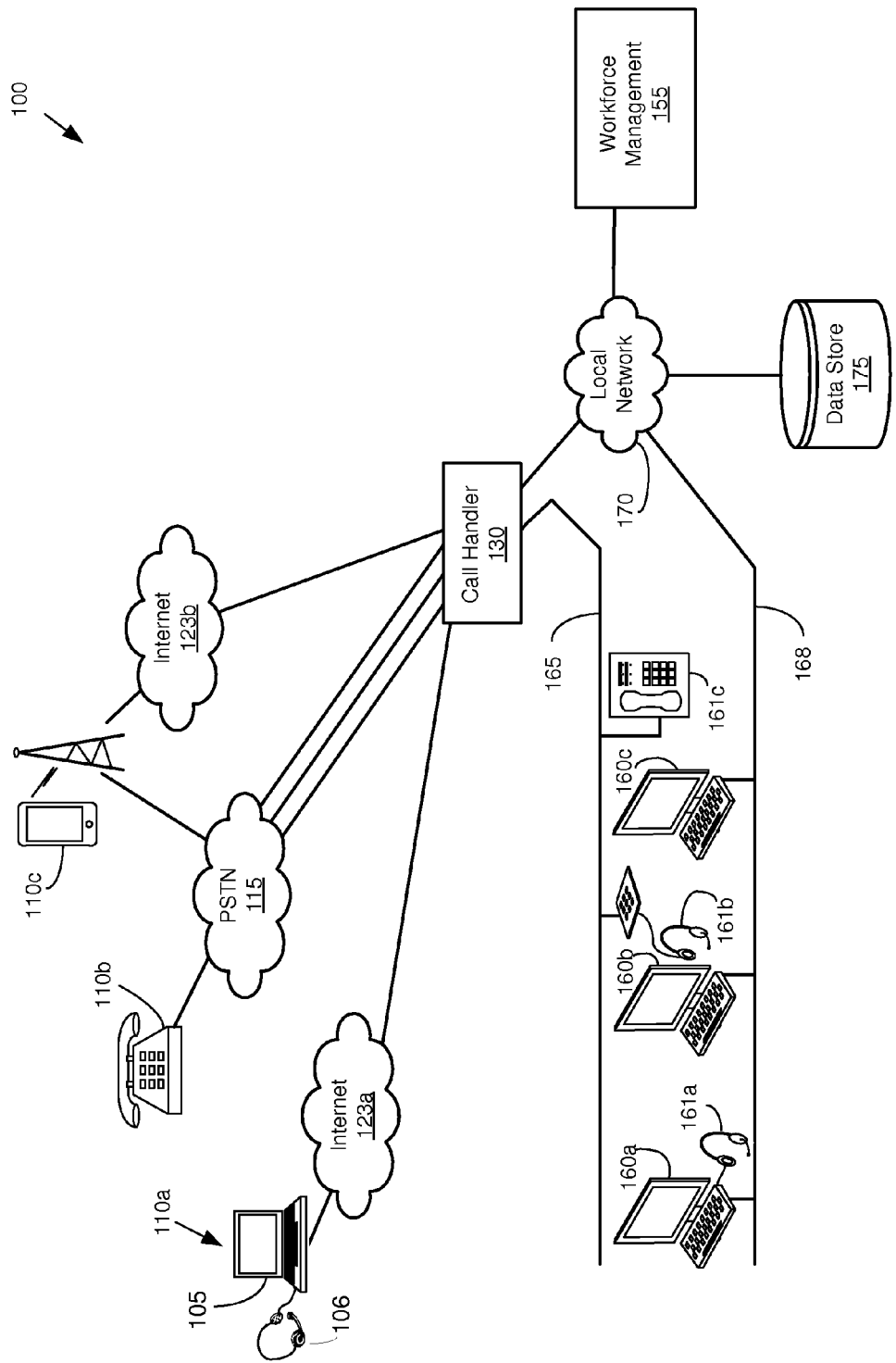
FIG. 1 shows one embodiment of a contact center architecture that may incorporate the concepts and technologies as disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Contact Center Architecture

FIG. 1 shows one embodiment of a contact center architecture 100 illustrating the various technologies disclosed herein. The architecture 100 shown in FIG. 1 may process voice calls that are inbound-only, outbound-only, or a combination of both (sometimes referred to as a "blended" contact center). Although many aspects of contact center operation are disclosed in the context of voice calls, in various embodiments, the contact center may process other forms of communication such as, for example, facsimiles, emails, text messages, video calls, and chat messages.

Since the call center may handle calls originating from a calling party, or initiated to a called party, the term "party" or "remote party" without any further qualification, refers to a person associated with a call or other form of communication processed by the call center, where the call is either received from, or placed to, the party. The term "caller," if used, will also generally refer to a party communicating with the call center, but in many cases this usage is exemplary and use of the term "caller" is not intended to limit the concepts to only inbound calls or voice calls, unless the context dictates such.

Depending on the embodiment, inbound voice calls may originate from parties using a variety of different phone types including, smart phone devices 110c, conventional telephones 110b, or computer-based voice processing devices 110a, which may comprise a computer 105 and a headset 106. For instance, a calling party may originate a call from a conventional analog telephone 110b connected to a public switched telephone network ("PSTN") 115 using an analog plain old telephone service ("POTS") line. The call may be routed by the PSTN 115 and may use various types of facilities, including, but not limited to: T1 trunks, SONET based fiber optic networks, asynchronous transfer mode networks, etc. Various types of routers, switches, bridges, gateways, and other types of equipment may be involved in the processing of the calls.

In various embodiments, inbound calls from callers to the call center may be received at a call handler 130, which could be, e.g., an automatic call distributor ("ACD"). In particular embodiments, the call handler 130 may be a specialized form of switch for receiving and routing inbound calls under various conditions. The call handler 130 may route an incoming call over call center facilities 165 to an available agent. The call handler 130 may also incorporate other switching functionality, including the ability of conferencing or bridging another entity to an existing call.

Depending on the embodiment, the facilities 165 may be any suitable technology for conveying the call to an agent, including but not limited to a local area network ("LAN"), wide area network ("WAN"), ISDN, or conventional TDM circuits. In addition, the facilities 165 may be the same, or different from, the facilities used to transport the call to the call handler 130.

In various embodiments, calls may be routed over facilities 165 to an agent for servicing. That is, for example, the party may speak with an agent to receive customer service. An agent typically uses a computing device 160a-160c, such as a personal computer, and a voice device 161a-161c. The combination of computing device 160a-160c and voice device 161a-161c may be referred to as a "workstation." In many instances, the computing device handles VoIP so that reference to the "computer workstation" or the "agent's computer" refers to the computer processing device aspect of the workstation, but which may be closely integrated with handling voice as well (e.g., via a so-called "soft phone" capability). Thus, for these particular embodiments, the workstation can be assumed to have at least a data capability and may also have a voice capability.

Depending on the embodiment, the interaction between the call handler 130 and agent computers 160a-160c, as well as other components, may involve using a local area network ("LAN") 170. In particular embodiments, when an agent is interacting with a called or calling party, the agent may use his computer 160a-160c to further interact with other enterprise computing systems, such as, an interactive voice response system ("IVR"), a recording system, payment processing system, etc.

In addition to receiving inbound communications, the contact center may also originate communications to a called party, referred to herein as "outbound" communications. In some embodiments, a call handler 130 may comprise a dialer, such as a predictive dialer, to originate outbound calls at a rate designed to meet various criteria. In various embodiments, the call handler 130 is typically configured to dial a list of telephone numbers to initiate outbound calls. Data for the calls may be stored in a data store 175. After the calls are originated, a transfer operation may connect the call with an agent or a queue.

The contact center may also incorporate a workforce management system ("WFM") 155. The WFM 155 is used in scheduling the agents handling the incoming/outgoing call volume. The WFM 155 may also track call volumes that may be used in forecasting the number of agents required the expected call volume. The WFM 155 is used by an administrator to schedule the agents, as well as update schedules based on agents failing to show or requiring unscheduled time off.

There may be coordination between the call handler 130 and the WFM 155 regarding the actual times when the agent is working, e.g., when the agent is "on-duty" and available to handle calls. In some embodiments, agents may use their workstation to indicate to the call handler when they are available or not, so that the call handler knows when to offer calls to the agent (or not). This information is initially received by the call handler and may be reported to the WFM. In some instances, a periodic log (e.g., hourly, daily, weekly) of such times may be reported to the WFM. Thus, information about when the agent logs onto the call handler, when they log off, and other information about the nature of the work activity the agent is engaged in, is provided from the call handler 130 to the WFM 155. In one embodiment, this may occur using the local network 170 whereas other embodiments may involve other facilities between the call handler and WFM. The WFM may acknowledge receipt of such information, and may further authorize certain of the agent's activities.

For example, an agent attempting to log into the call handler when they are not scheduled to work may result in the WFM denying such request to the call handler. In turn, the agent may be presented with information from the call handler indicating that they are not currently scheduled to work. The call handler may then prohibit the agent from logging on. In other embodiments, the call handler may allow the agent to log in, which is reported to the WFM, and an exception condition is noted by the WFM, namely that the agent is working during a non-scheduled time period.

Although a number of the above entities may be referred to as a "component," each may be also referred to in the art as a "computing device," "unit" or "system." Use of the word "server" does not require the component to interact in a client-server arrangement with other components, although that may be the case. A server may incorporate a local data store and/or interface with an external data store. Further, the above components may be located remotely from (or co-located with) other components. Furthermore, one or more of the components may be implemented on a single processing device to perform the functions described herein. In addition, the contact center architecture 100 may be provided as a hosted solution, where the call processing functionality is provided as a communication service (a so-called "communication-as-a-service" or "CaaS") to a call center operator. Thus, there is no requirement that the components identified above must be actually located in a call center location or controlled by a call center operator. In addition, depending on the embodiment, the agent positions may be remotely located from the other components of the call center, sometimes referred to as a "virtual call center." Further, the WFM 155 could be accessed as a hosted element, or where WFM services are provided to contact center operators. Those skilled in art will recognize FIG. 1 represents one possible configuration of a contact center architecture 100, and variations are possible with respect to the protocols, facilities, components, technologies, and equipment used.

Service Overview

Scheduling agents in a contact center using a WFM involves various steps. These steps can vary among different deployments of a contact center. A brief high level overview is provided to illustrate the overall process.

An initial step may involve developing a forecast of the call volume expected to be serviced for a defined period of time. This forecast may be based on application of historical call data or can use other techniques for generating the anticipated call volume to be handled. Next, a roster template may be produced, which indicates an optimum number of agents required at different times and the associated skill sets that are required to work during the defined period of time. The roster template, at this point, does not associate any particular available agent from a roster of agents with these times, but provides a skeletal set of times that need to be filled.

Finally, a roster of available agents is used to fill in the roster template. The roster indicates which agents are available to be assigned to the slots. In some instances, the roster template is defined taking into account the number of available agents, so that the available agents are sufficient to fill in the template. The completed association of the set of agents to the template is referred to as an instance of the roster template. Once the instance of the roster template is associated with specific days on a calendar, the result is a "schedule." This is but one approach for generating a schedule, and other steps, and different order of the steps, are possible.

In a variation of the above scheme, in many instances, the template and the association of agents to the template may be fairly consistent for the defined period of time. For example, consider a relatively simple schedule involving five agents, each of which works a day shift during the week (e.g., Monday-Friday). Further, one of the five agents is selected to work the weekend shift (Saturday). The contact center is presumed to be closed on Sunday.

For purposes of illustration, the contact center is presumed to have day shifts, which allow the contact center to field calls from 9:00 a.m. to 7:00 p.m. Of the five agents, some agents may start at 9:00 a.m. and end at 6:00 p.m., whereas others may start at 10:00 a.m. and end at 7:00 p.m. In either case, the agent is given appropriate lunch and rest breaks. Thus, even though all the agents may not start and stop at the same exact time, this type of shift may be known among the agents as a "day shift." The contact center operator may know that five agents during the week are usually sufficient to handle the expected call volume during the week. While there may be instances where the five agents may be underworked or overworked, the contact center operator may have decided that employing five agents on a regular basis during the week is administratively simpler than attempting to hire additional part time people or other such approaches. During peak season (if there is one), additional part time agents may be hired for several weeks. Further, in this example, a reduced level of staffing is required on each weekend, namely one agent is required to work each Saturday.

This example is reflective of a contact center operation where the staff comprises a predictable number of agents that are repeatedly scheduled over a recurring time period. In the above example, the recurring time period is one week. Further, these agents have a relatively stable portion of their respective schedule—e.g., each agent usually works each day during the week, although the exact start and stop times may vary. Finally, each agent is expected to periodically work a weekend shift. The variability occurs in the rotating nature of scheduling the weekend shift. Such a periodic shift could be referred to as a periodic rotating shift. It can be further assumed that working the weekend is undesirable to the agents, and hence agents avoid working more weekends than necessary.

One approach for scheduling the agents for the weekend shift is to use a "round-robin" assignment mechanism for selecting the agent to work an upcoming weekend. In this approach, the least senior agent is selected to work the immediately upcoming weekend, the next senior agent is selected to work the following weekend shift, etc. After the fifth agent, the process reverts back to selecting the least senior agent and the process repeats.

Figure 2:
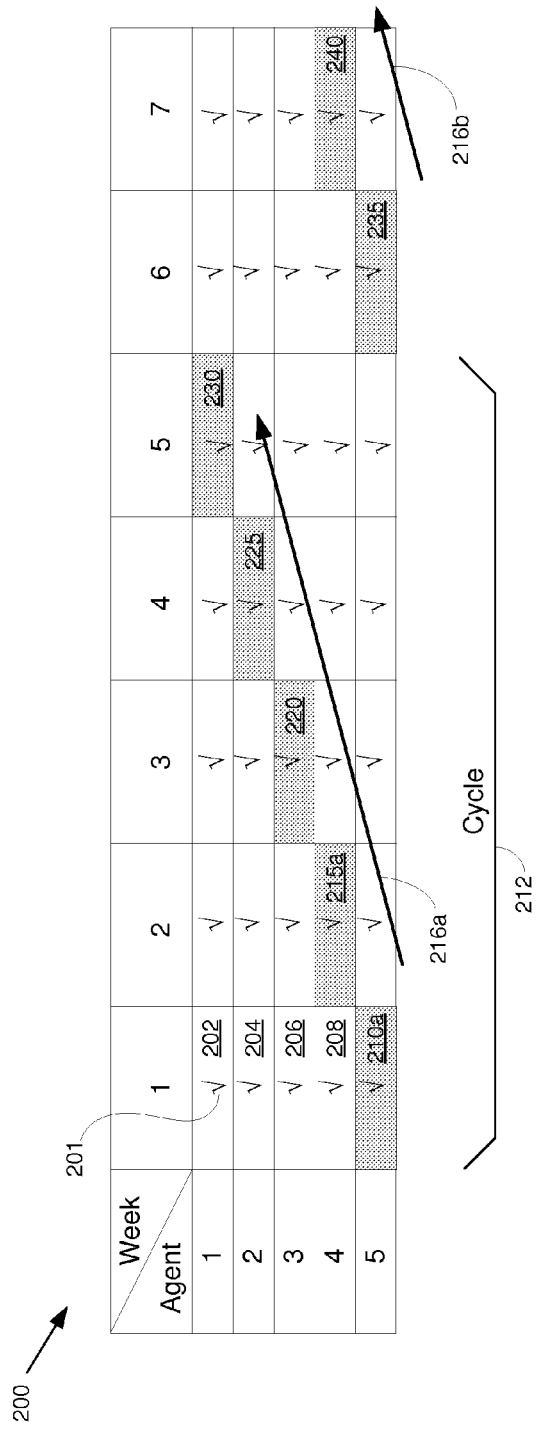
FIGS. 2A-2B illustrate a rotating shift schedule for a plurality of agents according to one embodiment of the invention.

These concepts are the basis for the example shown in FIG. 2A. Turning to FIG. 2A, a shift schedule table 200 is shown that identifies five agents in the leftmost column, designated as agents 1-5. For purposes of illustration, it is assumed that the agents are listed in terms of seniority. Thus, agent 1 is the most senior and agent 5 is the least senior.

Horizontally, the columns represent consecutive weeks, and these are numbered 1-7. The scheduling period, i.e., the time period for which schedules are produced, may be assumed to be weekly. Thus, there is no need to show each individual weekday. At the end of each week, the schedule for the following week may be determined. The shift schedule table 200 shows the resulting schedules at the end of seven weeks; a greater or lesser number of weeks could have been depicted. Depending on a relative timeframe, the schedule could reflect schedules that were actually worked by the agent, or schedules that are anticipated to be worked. In other words, if the present time is week 0 (e.g., before week 1), then the shift schedule table reflects a planned scheduled. If the present time is the end of week 7, then the shift schedule table reflects the actually worked schedules. For purposes of illustration, it will be assumed that the table reflects a planned scheduled, i.e., week 1 has yet to begin.

The shift schedule table 200 could be expanded for as many weeks as desired. Further, the starting week relative to a calendar is arbitrary. That is, it is not necessary the first week to be the first week of the calendar year. The first week could be any given week in a calendar. Thus, it is possible that a projected seven week work schedule is developed at the end of each week. As will be seen, this would allow the projected work schedule to take into consideration the actually worked schedules of the agents. Or, the seven week work schedule could be developed in advance for all seven weeks.

The shift schedule table 200 contains a series of cells (e.g., 202-208). The checkmark (e.g., 201) signifies that the corresponding agent is scheduled to work all days of that week. A quick glance at the shift schedule table 200 shows that all cells are checked, meaning that every agent is scheduled to work each day of the weekday shift. In this example, absent a scheduled vacation, day off, or sickness, each agent works each day shift during each weekday. In other embodiments, the columns could be further sub-divided into days of each week, which would be useful if it is necessary to track when certain agents worked certain weekdays.

As noted earlier, in this example, each of the five agents works one of the day shifts, five days of the week. That aspect of the schedule is fairly static, and thus, the checkmark is not necessary. The checkmark may be more useful if, e.g., only four of the five agents worked each week. The concepts disclosed herein can be expanded to show each day of the week for a repeating portion of a schedule.

The shift schedule table 200 also indicates which agent works the weekend shift. This is designated by grayed-out cells 210a, 215a, 220, 225, 230, 235, and 240. Alternatively, this information could have been indicated via another form of checkmark, but using grayed-out cells facilitates identification of recurring patterns as will be seen.

Recall that each agent is expected to work a weekend shift, and since the agents are listed in decreasing order of seniority, it is presumed that the least senior agent is selected first to work the weekend shift. Thus, for week 1, the cell 210a for Agent 5 is grayed-out, indicating that Agent 5 is scheduled to work the upcoming weekend. For week two, the cell 215a for Agent 4 is grayed-out, to reflect that Agent 4 is scheduled to work the weekend. For week three, cell 220 is grayed-out showing that Agent 3 is scheduled, and week four has cell 225 grayed-out for Agent 2. Finally, in week 5, cell 230 is grayed-out reflecting that Agent 1 is scheduled for that corresponding weekend.

In summary, each agent is scheduled to work a corresponding weekend where the order is initially based on the agent's seniority status. It takes five weeks to rotate through the five agents, and the process repeats in week 6 as shown by cell 235 grayed-out followed by cell 240 in week 7. The sequence of gray-out cells 210a, 215a, 220, 225, 230 forms a pattern that is referred to herein as a "stripe." In various instances this term ("stripe") may refer to the set of grayed-out cells for a single cycle 212, which is the time period for the stripe 216a to repeat in another cycle as stripe 216b. In other instances, a stripe may refer to a subset of cells in a pattern. The collection of repeating stripes is called a "stripe pattern."

The stripe pattern may useful to visually verify that the rotating assignment of the weekend schedule is equitable. Hence, the administrator may be presented with a schedule where the rotating shifts are highlighted in some manner. However, for a large number of agents, or agents which are not in a certain order, the pattern may not be readily evident as being equitable. As expected, for any given agent working a weekend, the following four weeks represent weeks when that agent is not scheduled to work a weekend. Thus, a regular stripe pattern means that no agent is working weekends back-to-back while other agents are passed-over for weekend shifts. The shift schedule table 200 could be extended out for further weeks, but it is evident that the stripe pattern will repeat for each cycle. Thus, it is possible to accurately predict the agents that should be scheduled in upcoming weeks. In the examples shown herein, space limitations generally limit the figures from illustrating more than one or two cycles.

The shift schedule table 200 is not focused on presenting details of the agent's shifts that are the same week-to-week. Specifically, because each agent works each day shift of each weekday, this may be summarily indicated by a single checkmark in a single cell representing the entire week. The illustration could be modified to show, e.g., each weekday with an indication that each agent is scheduled for each day. However, for the immediate purposes of illustrating how rotating schedules are addressed, this level of detailed is not necessary. In fact, going forward the checkmarks are dispensed with, since it will be assumed in this example that each agent works a day shift during the week. As will be seen, the shift schedule table 200 is designed to illustrate how periodic rotating shifts are scheduled, and then how it can accommodate exceptions thereof.

The shift schedule table 200 of FIG. 2A shows a seven week schedule where the shaded cells indicate which agent is scheduled to work the weekend shift. Further, the agents are assumed to be in a prioritized order, based on some criteria. This could be based on seniority, skill level, alphabetical order, etc. Thus, agent 1 is the highest ranking and agent 5 is the lowest ranking. The ranking will be used as a tie-breaker, as will be seen.

FIG. 2B illustrates a point-based scheduling scheme that can be used to generate the schedule. Because this example is relatively simple, developing an equitable shift rotation could be done in an ad-hoc manner. For example, the least senior agent (Agent 5) is selected first, followed by the next least senior agent, and so forth. The challenge is to define an appropriate algorithm that can do this in an equitable manner while accommodating the various exceptions that can be expected to occur.

Turning to FIG. 2B, each agent is assigned points for shifts that are expected to be worked. This can be also defined as assigning points to agents for shifts that actually have been worked, which allows the schedule to be used for real-time schedule adjustments, as will be later seen. In this example, each agent is allocated or given a point for each weekday shift and three points for a weekend shift. Recall that each agent normally works each weekday, and hence at the end of the week they each will have accumulated five points. For the sake of simplicity, and to emphasize the scheduling aspects of the weekend shift, rather than showing each day within each week, FIG. 2B depicts the week as a single entity. Thus, for the first week, Agent 1 accumulates five points, as does Agent 2, Agent 3, and Agent 4. Further, Agent 5 also initially accumulates five points. However, since one of the agents has to work the weekend, and Agent 5 is the lowest ranking agent, Agent 5 is assigned to work the weekend and further accumulates three points for a total of eight points.

The agent completing Week 1 with the lowest number of points is then selected to work the next weekend, Week 2. Since Agents 1-4 all have five points, the lowest ranking agents is selected, namely, Agent 4. Agent 4 will work each weekday of Week 2 for five points, and the weekend, for three more. Thus, Agent 4 will gain eight points in Week 2 for a total of thirteen points. Note that Agent 5, which had eight points will also work each weekday of Week 2 to accumulate five points for a total of thirteen as well. Thus, agents 1-3 will each accumulate five more points for a total of ten points. The relative point standing is indicated in the column under Week 2.

To determine which agent will work the weekend for Week 3, the process is repeated. Namely, the agent completing Week 2 with the fewest number of points is selected. Since Agents 1-3 each have 10 points, the lowest ranking agent is selected, namely, Agent 3. Thus, Agent 3 will have 8 points added for a total of 18 points during Week 3. Agents 4 and 5 add five points, and also totaling 18 points. Agents 1 and 2 accumulate only 5 each, and so they each have 15.

To determine which agent will work the weekend shift for Week 4, the process is repeated. Namely, the agent ending Week 3 having the fewest number of points is selected. Since Agents 1 and 2 each have 15 points, the lowest ranking agent is selected, namely, Agent 2. Thus, Agents 2-5 will accumulate 23 points during Week 4, with Agent 1 having 20 points.

To determine which agent works the weekend shift for Week 5, the process is repeated. In this case, looking at Week 4, the agent with the lowest number of points is Agent 1, which happens to be the only agent that has not worked a weekend shift. After Week 5, Agent 1 accumulates 8 more points for a total of 28, which is the same as Agents 2-5. At this point, repeating the process for Week 6 results in the cycle repeating, and since all the agents have the same amount of points, using the lowest ranking agent as the tie-breaker means that Agent 5 will work the next weekend shift.

This point scheme results in an equitable assignment of weekend shifts. The premise is that undesirable shifts are allocated more points. Thus, the weekend shift is allocated 3 points whereas each weekday shift is allocated 1 point. The exact values could be different and do not have to be whole numbers. Agents who work undesirable shifts accumulate more points and selecting the agent with the lowest point total to work the next weekend shift means that the agent that has worked the least number of undesirable shifts is selected first. In other words, the agent with the lower number of points is the agent who is due to work the weekend shift.

Thus, looking at Week 4, of FIG. 2B, Agent 1 has not worked the weekend shift in this schedule table, whereas each of the other agents have worked a weekend shift. Selecting any agent other than Agent 1 to work the next weekend shift would unfairly allocate that other agent the undesirable shift, and favor Agent 1. In other words, selecting one of Agents 2-5 would have that agent repeat a weekend shift when Agent 1 has never yet worked a weekend shift. As expected, by Week 4, Agent 1 has the fewest number of points indicating he has worked the most desirable shifts, and hence should be selected to work the next weekend shift.

If, instead, the tie-breaking criterion was to select the highest ranking agent first, then Agent 1 would have been selected first at Week 1. Next week, it would have been Agent 2, etc. It become evident that the stripe pattern would be reversed, e.g., instead of an increasing staircase pattern of FIG. 2A, the stripe pattern would be a decreasing staircase. In either case, this point-based approach results in each agent working the weekend after being off for four consecutive weekends. This is deemed to be equitable, since all agents have the same cycle. While it is easy to see the pattern in the figures, it may be more complicated when there are hundreds of agents, and they are not necessarily listed in terms of seniority.

Handling exceptions, i.e., when an agent cannot work an expected weekend shift, is simplified using the point system. In the past, the administrator may have been required to manually adjust the schedule. It may not be clear to the administrator how to best accomplish this or in a worst case, the administrator would have to 'rebuild' the schedule.

For example, recall from FIG. 2B that in the Week 4, Agent 2 is scheduled to work the weekend. Suppose that Agent 2 indicates in advance to the administrator that he is unable to work that weekend due to a family function. Obviously, another agent will have to replace Agent 2 during Week 4. The above described algorithm is adapted to equitably handle such exceptions.

Figure 3:
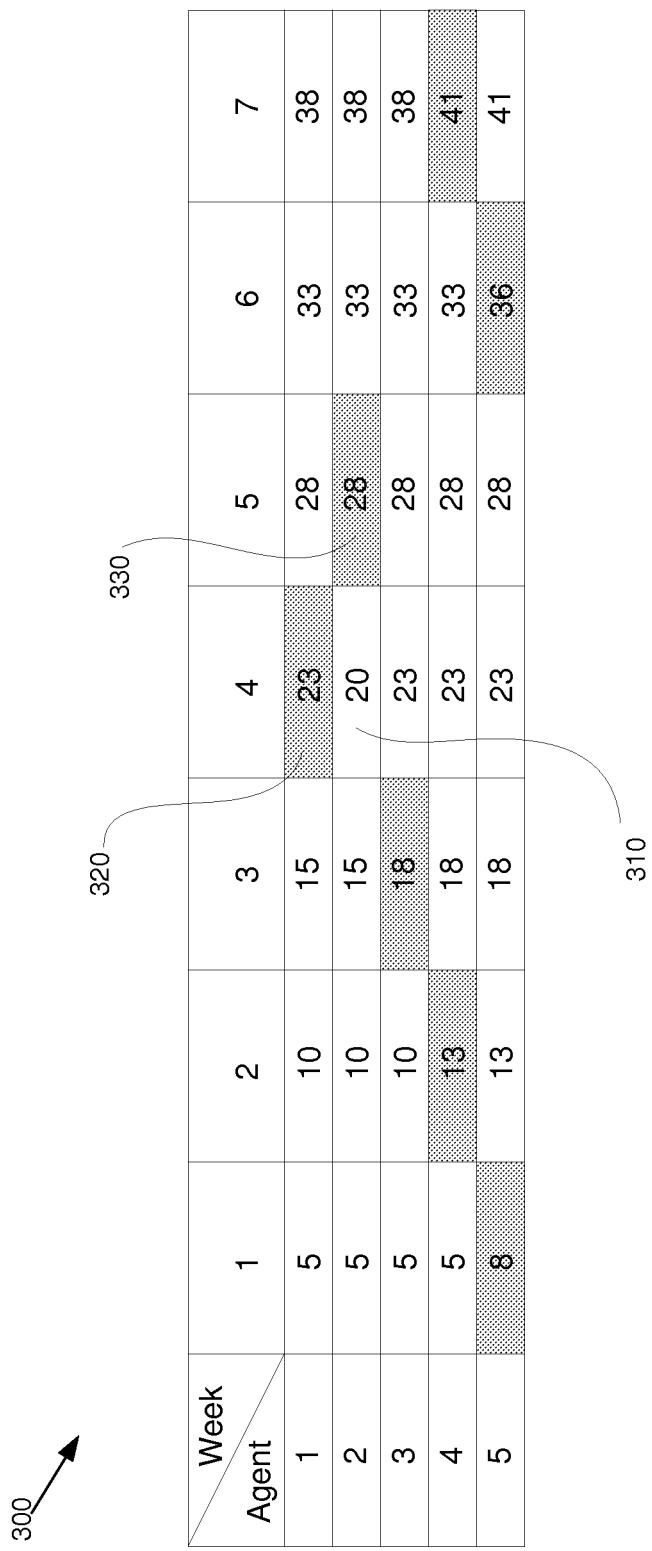
FIG. 3 illustrates a modification to the rotating shift schedule of FIGS. 2A and 2B according to one embodiment of the invention.

Turning to FIG. 3, the shift scheduling table 300 illustrates the situation. For this purpose, attention can be focused only on the grayed-out cells, which indicate which agents are allocated to a weekend shift. Normally, cell 310 would be associated with Agent 2 and grayed-out, but Agent 2 has indicated in advance of creating this schedule that they cannot work the weekend for Week 4. As can be seen, instead cell 320 is grayed-out indicating that Agent 1 is working Week 4, and instead Agent 2 is working the weekend for Week 5 as evidenced by cell 330 being grayed-out. Essentially, Agent 1 and Agent 2 have 'swapped' their respective weekend shifts. Then, the cycle repeats with Agent 5 working the next weekend shift, etc.

The point-based scheduling scheme can accommodate this exception. Assume that Agent 2 indicated early on that they had to have the weekend off for Week 4. At Week 1, it can be predicted that an issue arises for Agent 2 in Week 4. Once Agent 2 makes his request known, an indication is essentially associated in the table for cell 310 indicating that Agent 2 is unavailable, e.g., Agent 2 must have the weekend off. The algorithm used reviews the points accumulated at the end of Week 3 and again selects the agent with the lowest score. If there is a tie among agents having the lowest score, then the lowest ranking agent is selected provided that the agent is not excluded from being selected. In other words, if the agent with the lowest ranking is selected and if they are marked as being excluded from being scheduled, then they are skipped over and the next lowest ranking agent is selected.

Applying this algorithm to FIG. 3, during Week 3, Agents 1 and 2 have the lowest scores, and Agent 2 has the lower ranking of the two. However, since Agent 2 has been excluded from selection, the next lowest ranking agent is Agent 1. Thus, Agent 1 is selected for Week 4. As a result, Agent 1 accumulates 8 points during Week 4, while all other agents (working only during the week) accumulate 5 points.

Looking at the point accumulation for Week 4, the agent with the lowest points is selected, which is Agent 2. Thus, Agent 2 is selected for the weekend shift for Week 5. For the following weeks, the cycle repeats as shown in FIG. 2A. Note that because Agent 2 was excluded for his turn of working during Week 4, Agent 1 will have had only three weekends off (e.g., during Weeks 1-3) instead of the normal four. However, thereafter, the normal schedule reverts, with each agent having four weekends off.

Application of the point allocation algorithm allows generating a schedule taking into account the agent exception and addressing the exception in an equitable manner. If Agent 3 has been selected to work the weekend shift for Week 4, then Agent 3 would have worked two weekends back-to-back. Similarly, if Agent 4 had been selected, then Agent 4 would have had only one weekend off before having to work another weekend shift. Similarly, if Agent 5 had been selected, then Agent 5 would only have had two weekends off. Thus, Agent 1 is the most equitable choice for accommodating the exception. The point allocation system will always favor the eligible agent that has the lowest point standing.

In many contact centers, agents may negotiate among themselves to arrange a "private" swap of shifts. If so, this ad-hoc swap is presumed be acceptable to the parties and most likely acceptable with the administrator. This type of ad-hoc swap can be reflected in the schedule by manually updating the schedule. However, in instances where the Agent is not able to negotiate a swap and merely informs the administrator of their unavailability, then the administrator must somehow update the schedule and the above approach allows the updating to be done in an equitable manner. If the swap is mutually agreeable, then it may not be necessary to alter the allocated points.

Figure 4:
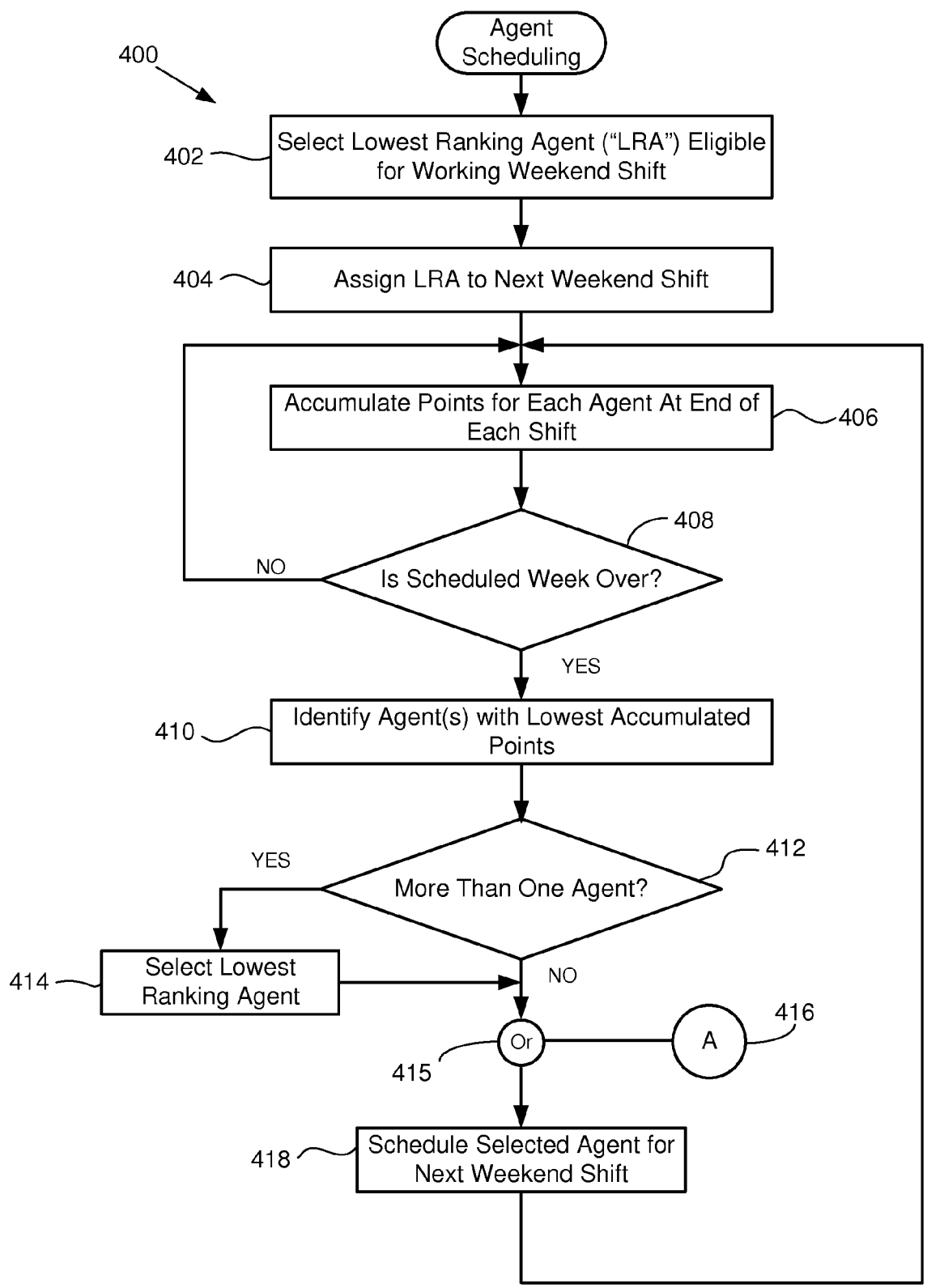
FIGS. 4-5 illustrate process flows for assigning shifts to various schedules according to one embodiment of the invention.

One embodiment of the process flow for allocating points is shown in FIG. 4. The process 400 begins with selecting the lowest ranking agent that is eligible for working the weekend shift in operation 402. The lowest ranking agent can be based on any type of criterion, as long as it is capable of resolving a tie among multiple agents. Thus, a start date may suffice (as long as multiple agents do not have the same start date). If that is not sufficient, the criterion can be defined as having multiple aspects. For example, it could be the agent's start date and the agent's date of birth. Thus, if two agents were hired on the same day, then the birth date could be the tie-breaker. In many cases, seniority is the criterion used, and if there is a tie, then performance level could be used as a secondary tie-breaker. Further, in this example, the undesirable shift which is being rotated is the weekend shift. The undesirable shift could be another shift, based on other circumstances. For example, the algorithm can be adopted to select agents to work a holiday or select which agents have to work an evening shift.

Next, that selected agent is assigned to work the weekend shift in operation 404. The starting point of which agent is assigned to work the upcoming shift may be arbitrary in some instances. In this example, the lowest ranking agent ("LRA") is selected. These operations 402 and 404 may be used in a so-called "fresh-start" scenario, when agents are working, e.g., in a new environment, beginning a new campaign, etc. In other instances, the upcoming schedule may take into account the prior work schedules for existing agents. For example, if a new schedule is being developed for a new campaign and the lowest ranking agent selected in operation 402 just completed a weekend shift from a prior campaign, the administrator may override the selection from operation 402 and instead assign a different agent to the next weekend shift (not shown in FIG. 4).

Next, in operation 406, each agent accumulates points for each shift scheduled to be worked. In other embodiments, points can be accumulated for each shift actually worked. As will be seen, allocating a point to each agent for each shift regardless of whether the agent actually worked does not penalize agents who miss, for example, a shift due to sickness. Agents may be given a fixed number of "passes" wherein points accumulate regardless of whether the shift was actually worked. Thereafter, a point may be deducted (or not accumulated) for each shift not worked. Deduction of a point will impact the scheduling of that agent in that agent will have less preferential treatment going forward.

It is presumed that the points accumulated for the weekend shift are greater in value relative to the points accumulated during the weekday shifts in order to reflect the relative undesirability of working a weekend shift. Although this example assigned three points, a different value could be assigned. The process loops in operation 408 until the scheduling period is completed (which is assumed to be one week in this example).

The accumulation of points can be projected out for purposes of generating a schedule. Specifically, it is not necessary to wait for each day in the scheduling period to actually end before accumulating points. Rather, the process can be executed on a projected basis so that the schedule for the upcoming scheduling period is determined all at once. In fact, multiple scheduling periods can be generated for far out time periods, even beyond what is practical. Thus, a schedule can be developed for an entire year, even though agent may receive a new schedule every week or two, or month.

After the scheduling period is completed, then the flow continues to operation 410. This begins the portion of the process flow that determines which agent should work the following weekend shift. In operation 410 the agent with the lowest number of accumulated points is identified. If there is more than one agent identified in operation 412, then the process flow continues to operation 414 selecting the lowest ranking agent among these. The output of operation 414 (as well as the output of operation 412 if the determination was "no") will be a single agent.

At point 415, various options in processing may occur. In one embodiment, operation 418 is encountered that schedules the selected agent to work the next weekend shift. The process then loops back to operation 406 where points are accumulated for each agent, including the selected agent, and the process repeats. Although not indicated in the flowchart, the process repeats for the appropriate number of agents. That is, once all the agents are scheduled, the process is no longer executed. This optional process flow at point 415 presumes that the selected agent is available for scheduling in operation 418.

As discussed above, it is possible that the selected agent cannot work, and an exception condition has been noted. If so, then scheduling the agent for the weekend shift is moot, since they cannot work. The process flow for ascertaining such scheduling exceptions is indicated by icon A 416, which leads to the process flow 500 of FIG. 5.

Figure 5:
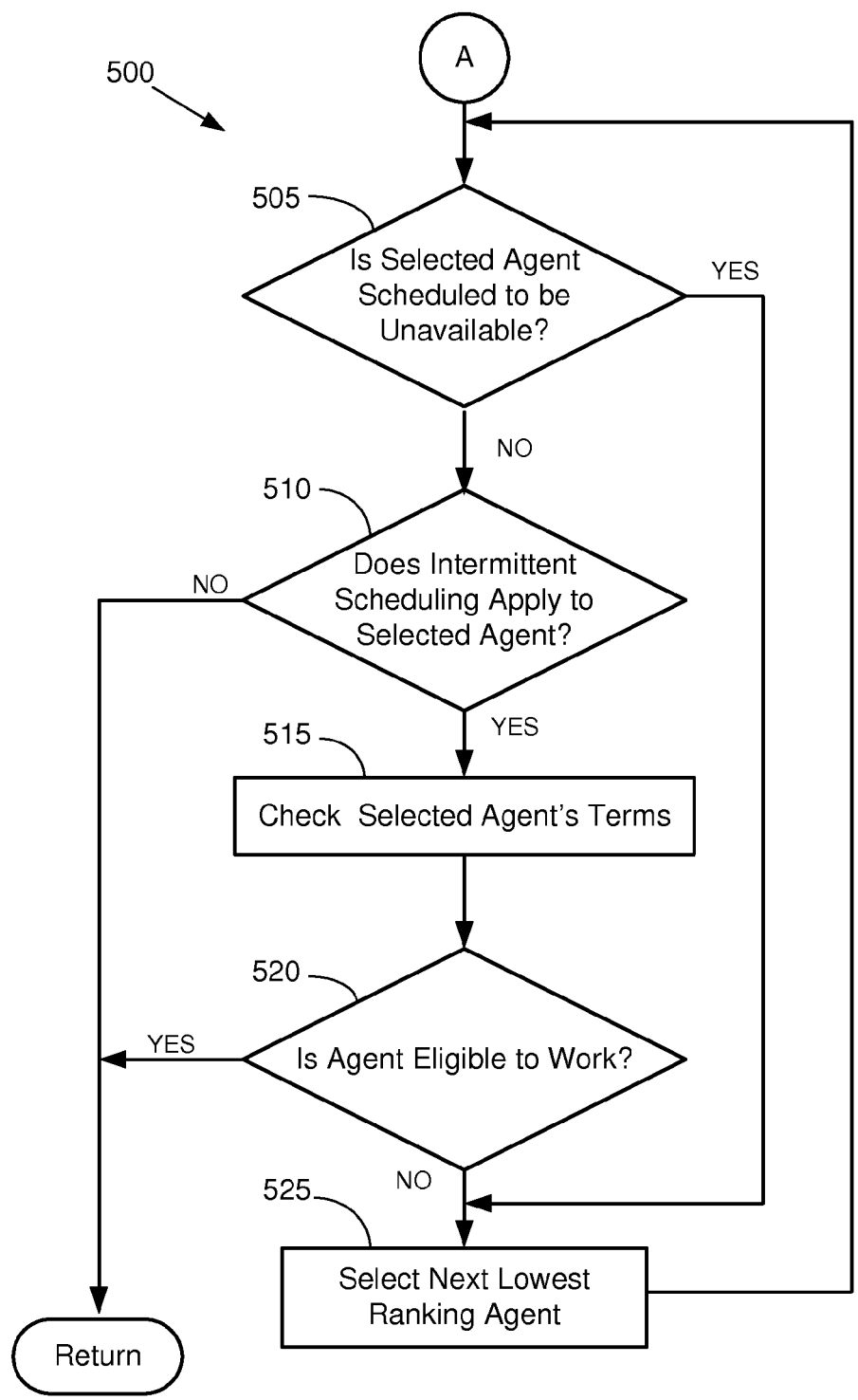

Turning to FIG. 5, an initial determination is made in operation 505 whether the selected agent is scheduled to be unavailable. In other words, has that agent made it known in advance that they cannot work that weekend? This is not the same as an unscheduled absence, which is typically not known until the shift in question begins. Thus, some mechanism for recording planned unavailability is checked in operation 505. If the agent is scheduled to be unavailable, then the "YES" branch is followed to operation 525 where the next lowest ranking agent is selected. The process is repeated by looping back to operation 505 to ensure that agent is available.

If the agent is not scheduled to be unavailable in operation 505, then the "NO" process flow is followed to operation 510. There, a determination is made whether the intermittent scheduling applies to the selected agent. If the answer is "NO," then the selected agent is available for working the weekend shift and the process returns to point 415 of FIG. 4.

Intermittent scheduling may be defined to accommodate unique treatment of certain agents. For example, in one embodiment, senior agents may have to work undesirable shifts, but only half as often as other agents. In other words, a senior agent may only work the weekend shift every other time when they are scheduled to work. This could be expressed as a percentage such as an exemption rate or a duty rates. An agent exempt from working any weekend shift would have a 100% exemption rate and a 0% duty rate. An agent exempt from working every two of three weekend shifts would have a 66% exemption rate, etc. Intermittent scheduling can accommodate agents returning from sick leave, agents which simply cannot work any weekends, function as a reward, etc.

Intermittent scheduling can be implemented as a modulo-n counter, where "n" is the number of weeks in the cycle for that agent. For example, a modulo-3 counter would have values 1, 2, and 3. Every time the agent is scheduled for a weekend shift, the counter is incremented and whenever the counter is equal to three, the agent is removed or skipped from that weekend shift. As a result, the agent only works 2/3 as many weekend shifts as other agents (i.e., a 33% duty rate or 66% exemption rate). This provides additional flexibility in generating schedules for rotating shifts in an automated manner.

Returning to FIG. 5, if intermittent scheduling is applicable, then in operation 515 the selected agent's intermittent scheduling terms are checked. If the agent is eligible to work the scheduled weekend shift, then in operation 520 the "YES" branch is followed. If the determination is "NO" in operation 520, then in operation 525 the nest lowest ranking agent is selected and the process loops back to operation 505.

Multiple Agents

The previous example was based on selecting one agent from among five to work a weekend shift. In other applications, a plurality of agents may be selected to work a particular shift. Assume for the next illustration that there are seven agents, and two of the seven agents are selected for different treatment scheduling-wise. The different treatment may involve selecting two of the seven agents to work a weekend shift, a double shift, or to receive training. For purposes of illustration, it will be assumed that a rotating shift is identified for agents to work a double shift.

Figure 6A:
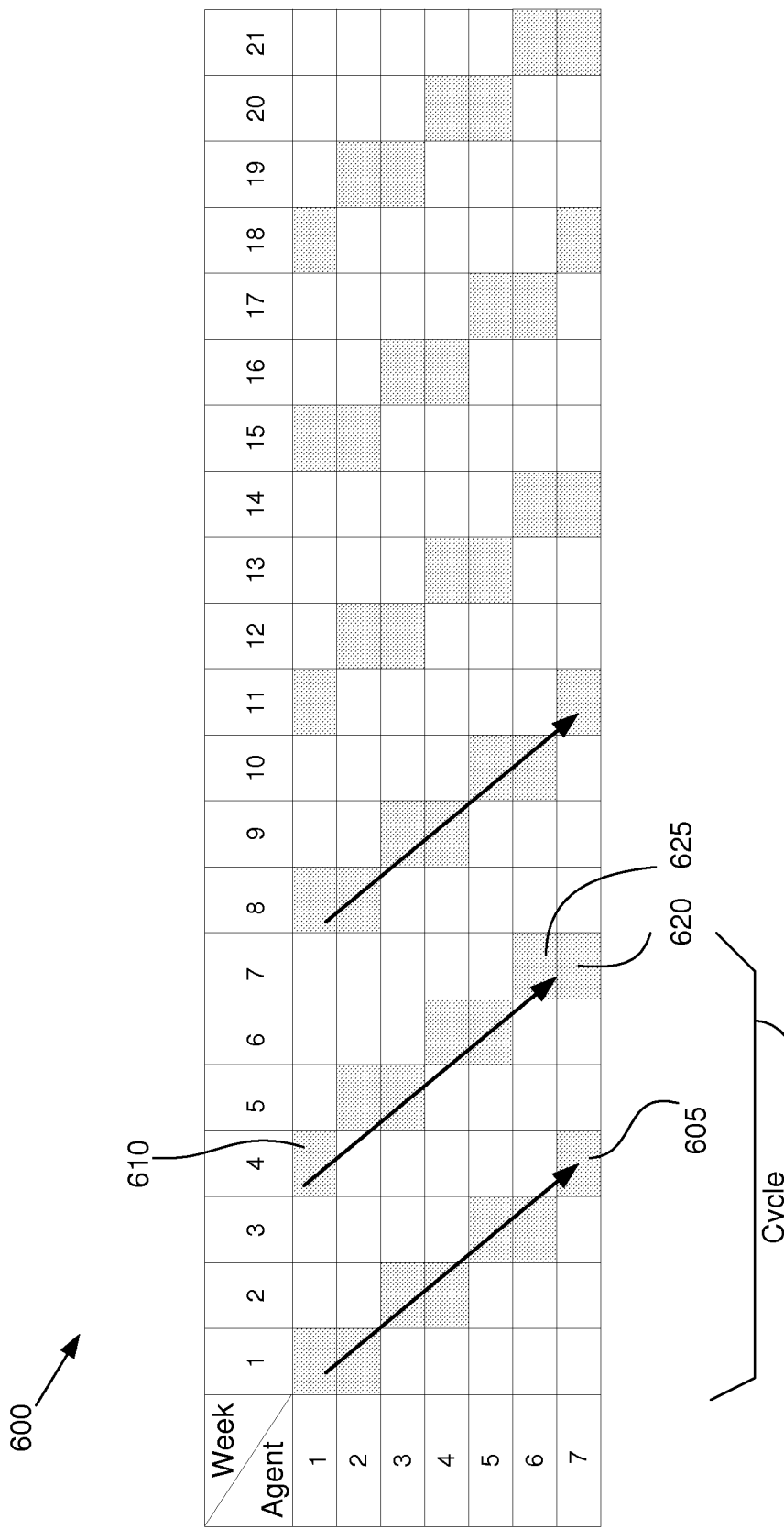
FIG. 6A illustrates a stripe pattern of a rotating shift according to one embodiment of the invention.

FIG. 6A shows on stripe pattern of an equitable schedule for the seven agents over a 21 day period. As before, the shift scheduling table 600 represents workdays in the horizontal columns and represents the agents in the rows. Again, agents are ranked in some order. In this example, Agents 1 and 2 are selected or "paired-up" to work the double shift on Day 1. On Day 2, Agents 3 and 4 are selected, and on Day 3, Agents 5 and 6 are selected. For Day 4, there is a "split" in the pattern, as evidenced by cells 605 and 610. Specifically, since there are an odd number of agents, Agent 7 is paired-up with Agent 1. Then, for Day 5, Agent 2 and 3 are paired-up for working the double shift, and so forth. By Day 7, Agents 6 and 7 are paired-up as evidenced by cells 620 and 625. This represents the end of the cycle 602, and the process repeats. Notice that in reviewing an agent's schedule horizontally, they will exhibit a pattern (in some form) of having two normal shift days, working a double shift, and having three normal days. Thus, over a long term, the pattern is equitable.

To generate this schedule, a modified form of the algorithm is used. The algorithm is modified to demonstrate that alternatives can be defined to accomplish similar outcomes. In this illustration, the each agent accumulates a negative point (−1) point (e.g., a point is subtracted) for each shift the agent works. Whenever an agent works or is scheduled to work a double shift, they accumulate two (+2) points. Thus, as an agent works each normal day (e.g., not working a double shift), their accumulated point value (a.k.a. "score") is decremented. If the agent works a double shift, their score is incremented by a point. On the average, since there are seven agents and only two agents work a double shift, agents will accumulate negative scores over time. Those that have worked the fewest double shifts will have the lower scores (e.g., more negative). Thus, the agent with the lowest score should be the one to be selected first for consideration for working the double shift. In this case, an agent with a higher score relative to other agents reflects that the agent has been working more double shifts.

In order to alter the algorithm to demonstrate another variation, assume that in this example the tie-breaking criterion is that the higher ranking agent is selected first. In this case, a double shift could be viewed as desirable, as it pays overtime. Thus, higher ranking agents are selected first to work the double shift.

Figure 6B:
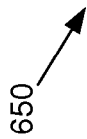
FIG. 6B illustrates a point table associated with the rotating shift of FIG. 6A according to one embodiment of the invention.

Turning to FIG. 6B, the allocation of points will be further explained. All agents are initially assigned a zero point value, and by the end of the first day, each agent has accumulated minus one (−1) points for working the day, but agents working the double shift accumulate +2 points. The agents with the lowest (i.e., most negative) score are then selected for the weekend shift for the following day.

For purposes of illustration, it is assumed that Agents 1 and 2 are selected first. To ensure they are selected, they are given a starting score of −1. Thus, they will have a net score of 0 at the end of Day 1, whereas the other agents have a score of −1.

To select the agents scheduled for the double shift for Day 2, the algorithm selects the agents with the lowest score (e.g., most negative), and if there is a tie, the most senior ranking agents are selected. With that, looking at the results for Day 1, Agents 3-7 all have the lowest score of −1. Since there is a tie, the two highest ranking agents are selected. Thus, Agents 3 and 4 are selected for the double shift for Day 2, since they are senior to Agents 5-7. The corresponding cells are shown as grayed-out for Day 2.

At the end of Day 2, Agents 1 and 2 have accumulated −1 to their score of 0, resulting in a net score of −1. Agents 5-7 however, accumulated a −1 point to their score of −1 resulting in a −2 score. Agents 5 and 6 are selected for working the double shift of Day 3, and their score increases to −1. Agent 7 in Day 3 accumulates a score of −3, reflecting that he has worked three days without a double shift. The remaining point values are obtained by repeatedly applying the above algorithm resulting in the point schedule as shown in table 650.

Figure 7:
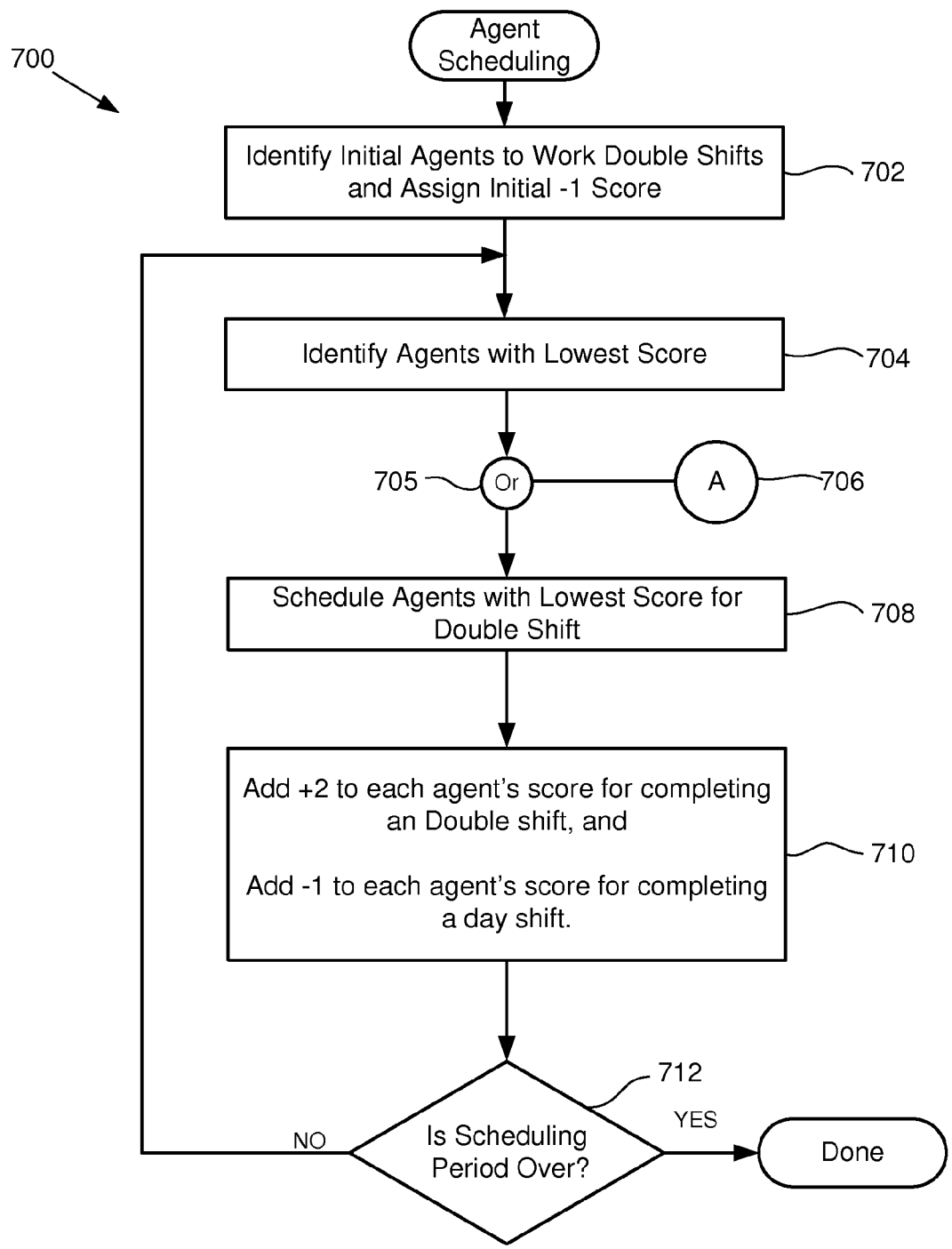
FIG. 7 illustrates a process flow for assigning points to a point table according to one embodiment of the invention.

The process flow 700 of FIG. 7 describes the flow described above. First, the agents initially selected are identified, and they are given an initial score of −1 in operation 702. This is because the two agents with the lowest scores are selected in operation 704. The selected agents can be scheduled for the double shift in operation 708. However, if there are any exceptions precluding scheduling the agent noted at point 705, the process 500 associated with FIG. 5 can be followed at icon A 706.

After scheduling the agents with the lowest score for the double shift in operation 708, the point allocation process in operation 710 is followed. Specifically, each agent on the double shift receives +2 points and each agent on the regular shift receives a −1 point. If the scheduling period is not completed in operation 712, e.g., additional scheduling is to occur, then the process loops back to operation 704. Otherwise, if the outcome at operation 712 results in completing the scheduling period, then the process is completed.

Figure 8:
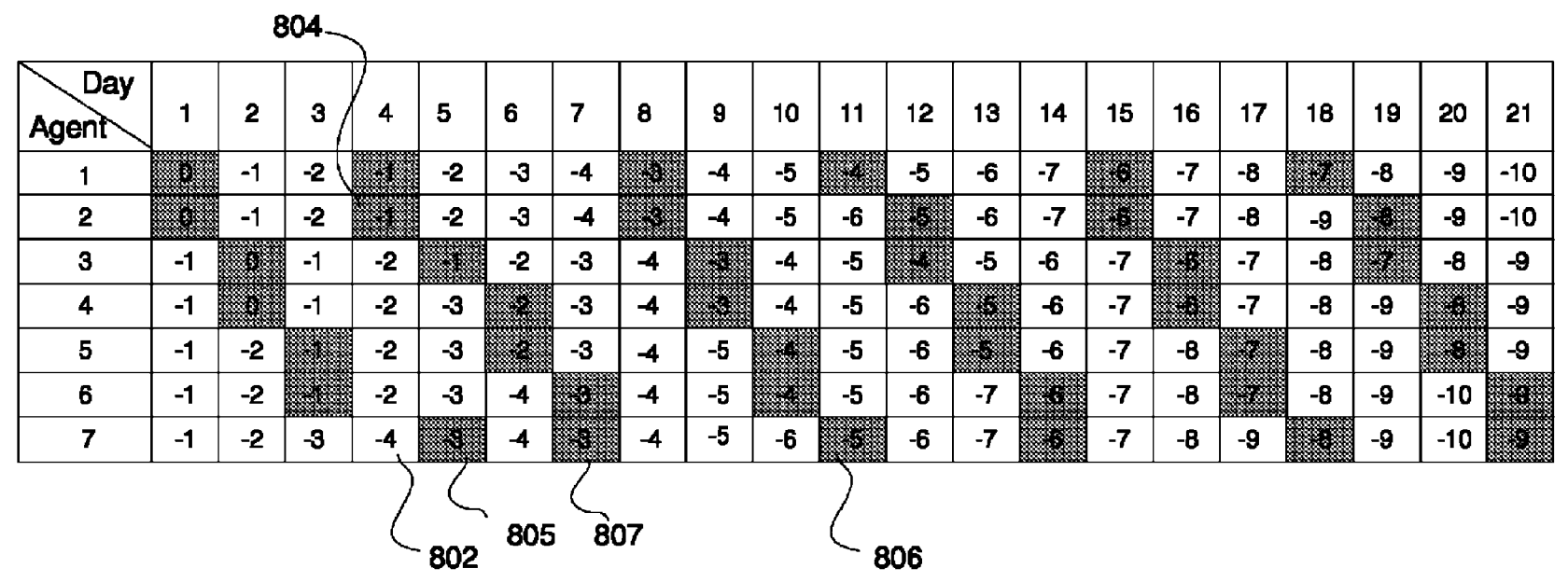

FIG. 8, which is based on FIG. 6B, illustrates application of the algorithm in handling an exception. In this case, Agent 7 has indicated that they are unable to work a double shift. Turning to FIG. 8, the shift scheduling table 800 illustrates what happens when Agent 7 is unable to work a double shift during Day 4, as shown by cell 802.

Applying the algorithm to the result of Day 3, the agents with the lowest score are Agent 7 and Agent 1 (although Agent 2 ties with Agent 1, Agent 1 is the more senior). Since Agent 7 is unavailable, the next available lowest scoring agent is selected. In this case, it is Agent 2 as indicated by cell 804. Consequently, for Day 4, Agents 1 and 2 are selected to work the double shift. Agent 7's score, however, is incremented for Day 4 to a −4, which is the lowest score. Consequently, Agent 7 is selected for the double shift for Day 5 as indicated by cell 805. Thus, the algorithm allows an agent to skip their turn, but their increasing negative score makes them a higher priority for being scheduled for the double shift at the next opportunity. Although Agent 7 only has one day between two double shifts, e.g., between cell 805 and 807, it compensates for the lack of having a double shift for Days 1-4. This algorithm will automatically revert back to a regular schedule, as indicated via the regular scheduling of Agent 7 on Day 11 as shown by cell 806.

Other Agent Exceptions

An agent may occasionally go on an extended leave, and if so, then any points they would normally accumulate can be set to zero (thereby, effectively not accumulating any points). In other embodiments, the algorithm can skip over null values, effectively removing that agent from being scheduled. If the agent is on extended leave, a separate "shadow" value of points can be accumulated as if the agent had worked, and this value can be used as an initial value when they return. This allows the agent to be included in scheduling as if they had not taken leave or otherwise penalized for taking a vacation. Alternately, the returning agent could simply be given a score value the same as other agents which effectively integrates that agent into the schedule on the returning date. In fact, depending on the algorithm, a starting point value can be assigned that ensures the agent is selected for a rotating shift as soon as possible. In this way, they will be quickly integrated into a regular scheduling pattern with the other agents.

Adding an agent into a schedule can also be performed by simply including the new agent in the group of agents and assigning the added agent as having the lowest (or highest) score. This requires providing the new agent with an initial score into the shift schedule table. The score assigned to the agent defines how quickly that agent will be integrated into the schedule. For example, based on the assigned score value the agent can be integrated into the schedule in the current stripe cycle, or can be set aside for a number of cycles, and then integrated. The latter operation allows a novice agent to be scheduled, for example, during the week during their initial month before then scheduling the agent to work a weekend shift.

FIGS. 9A through 9E illustrate the effects of assigning various initial score values to agents added to a schedule. These figures depict a schedule that initially involves seven agents, to which two agents are added to the schedule at day 11. These schedules do not depict days 1-7, because of space limitations.

Turning to FIG. 9A, a portion of a stripe pattern is shown as grayed cells for days 8-10. This shows that two agents are paired up for the rotating shift for each day for days 8, 9, and 10. On day 11, Agent 8 and Agent 9 are added and assigned values of −1 each in cells 902 and 904. Based on applying the algorithm, the Agent 8 and Agent 9 are not incorporated into the rotating shift until day 22 as shown by cells 906, 908.

Turning to FIG. 9B, Agent 8 and Agent 9 are instead allocate a value each of −4 when they start, as evidence in cells 912, 914. This results in the agents being assigned rotating shifts on day 16 as shown by cells 916 and 918. This is much earlier compared to the previous figure.

Figures 9C, 9D:
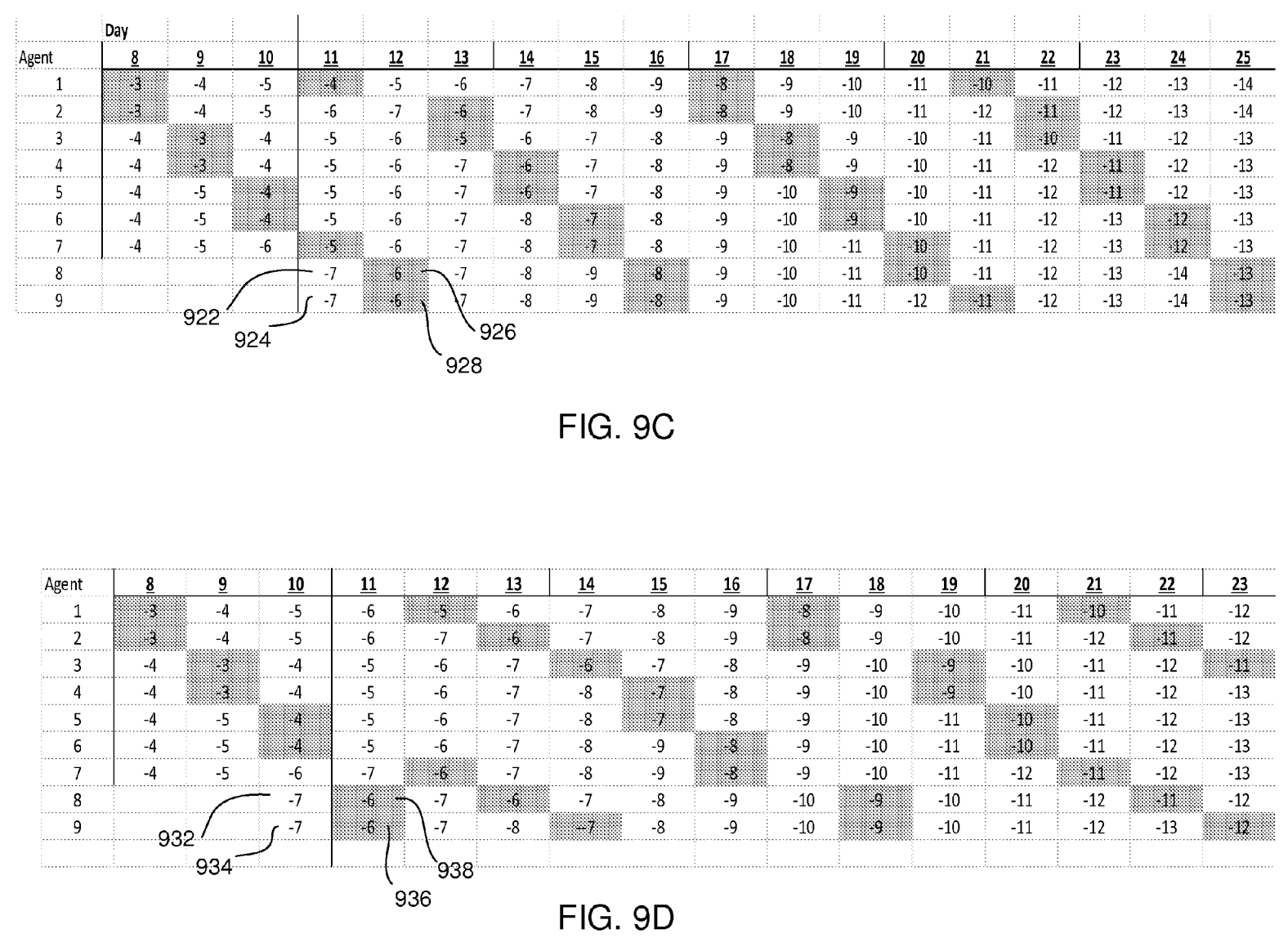

Turning to FIG. 9C, if Agent 8 and Agent 9 are instead assigned a lower value, e.g., −7 each in cells 922, 924, the agents are immediately assigned the rotating shift the next day, as shown by cells 926, 928.

In order to schedule Agent 8 and Agent 9 on the very first day for the rotating shift, it is necessary to assign them the value of −7 the day before, day 10 as shown in cells 932 and 934. This results in scheduling these agents on day 11, as shown by cells 936, 938.

Finally, in FIG. 9E, the effect of assigning two different starting point values to Agent 8 and Agent 9 is shown, as seen by cells 932, 934. In this case, Agent 9 will start the shift immediately on day 11 as evidenced by cell 936 and Agent 8 will start the following day, day 12 as evidenced by cell 938.

Thus, FIGS. 9A-9E illustrate how agents can be added to a shift schedule and based on the value of their initial score relative to others, the added agents can be integrated into a steady state scheduling pattern with different speeds. In these embodiments, a lower score relative to other agents means that agent should be favored for assignment. Further, as is evident, the algorithm will automatically incorporate the new agents into a repeating stripe pattern that can be considered equitable.

Rotational Templates and Cycles

Scheduling agents in a contact center may involve accommodating a wide range of requirements. For example, some contact centers may involve scheduling a relatively few number of agents based on a relatively stable set of contact center operational requirements, where as other contact centers may schedule hundreds of agents to meet weekly changing operational requirements. Further, various policy and regulatory requirements, as well as individual agent requirements, must be taken into account when scheduling the agents. For example, labor regulations may limit the number of hours an agent can work in a time period. For these reasons, each contact center may have a unique set of requirements that need to be taken into account. The selection algorithm can be augmented to ensure that the selected agent meets all of the requirements, and thus can be scheduled. If not, then that agent is passed over.

Facilitating Repeating Agent Schedules

In order to view the repeating stripe patterns that the schedules must be generated over a number of days. It is evident that in some embodiments, agents may be scheduled to work the same repeated shifts each week, and that manually scheduling each agent for each repeated time period can be time consuming and/or error prone. This may involve individually selecting an agent and associating a shift on a specific day with that agent, and repeating the process for the period of time. Automated approaches may be available, but they do not always have the flexibility or ease of use that is desired by contact center administrators.

Two logical constructs are defined to facilitate generating schedules in a rapid and easy manner. These contracts allow an agent, or group of agents, to be associated with a set of shifts, and the set of shifts are associated with a set of calendar days. In many cases, agents may work similar shifts over a number of consecutive days or other time periods. Further, these constructs allow flexibility without introducing undue complexity.

The first construct is called a "cycle", which defines one or more shifts within a scheduling period that an agent could be assigned to. A single shift for a single day could be by itself a cycle. The cycle can be named and associated with any necessary attribute of the shift, such as start/stop times, break times, skill levels, etc. For example, a "Monday Cycle" could be defined for a day shift that occurs on Mondays, with a defined start/end time from 9:00 a.m. to 5:00 p.m. A similar cycle could be defined for each weekday, as appropriate. If there is a Saturday Cycle, it may have shortened hours (e.g., 9:00 a.m. to 12:00 p.m.). The cycle represents one or more shifts that an agent could be assigned to, so it would unusual to define a cycle that is, e.g., 48 hours long, since an agent would typically not work a 48 hour shift.

A more sophisticated cycle would involve multiple shifts, typically over several days. For example, a "Weekday Cycle" could be defined spanning five consecutive day shifts, Monday through Friday, from 9:00 a.m. to 5:00 p.m. It is not necessary that the cycle cover consecutive days, nor that each shift therein have the same start/stop times. For example, a "Partial Weekday Cycle" could be defined as: Monday (9-5), Wednesday (8-4), and Friday (9:30-5:30). Again, the cycle must indicate shifts than an agent can work (in accordance with employment regulations and physical limitations), so a cycle that covers two overlapping shifts is not feasible, since an agent cannot work two simultaneous overlapping shifts.

The cycle construct allows common blocks of time to be defined so that an agent, or group of agents, can be associated with that cycle. Contact centers will typically have a common pattern of recurring hours and these can be deconstructed into commonly occurring cycles. For example, if the contact center is open 24/7, there will typically be three shifts each day: a day shift, an afternoon shift, and an evening shift.

The number of days that a cycle cover can vary. In the above example where the contact center is open 24/7, it may be logical to define a first cycle comprising a day shift, Monday-Sunday, with similar week-long cycles for the evening and night shifts. However, if agents cannot be assigned to work a seven day consecutive period (e.g., because of regulations), then defining such a cycle may be of little value. On the other hand, individual cycles could be defined for each shift and day. Thus, there may be a Monday Day Shift cycle, a Monday Evening Shift cycle, etc. The cycle construct provides an easy way to adjust flexibility and efficiency for each contact center's scheduling needs.

As noted, the number of shifts in a cycle may vary. The number of shifts in a cycle may represent a subset of a week, or may cover multiple weeks. Defining a greater number of shifts in a cycle provides efficiency in assigning an agent to these shifts, but it may also provide for less flexibility. For example, a cycle could be defined as comprising the day shift for each weekday (Monday-Friday) over an eight week period. However, if there is a holiday where the contact center is closed during a weekday (e.g., on a Monday), then this cycle would not be appropriate. In the examples illustrated herein, the cycles are typically less than a week in duration, but other embodiments are not restricted in this manner.

The next construct is called a "roster template." A roster template is a set of one or more cycles. A roster template can be associated with specific days or weeks on a calendar, and this facilitates defining repetitive schedules. Similar to a cycle, a roster template may also be identified by a name. An illustration of a roster template and its associated cycles is shown in FIG. 10.

Figure 10:
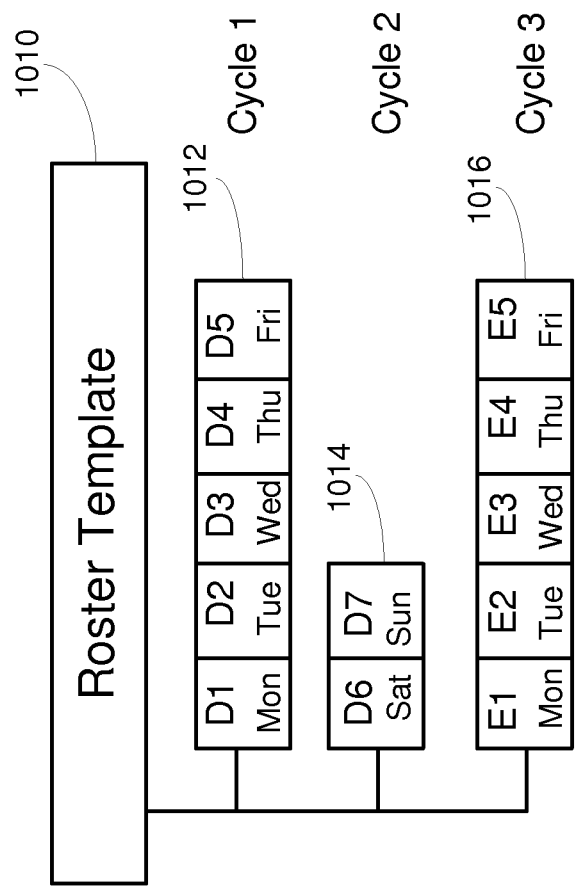
FIG. 10 illustrates the relationship of a roster template and various cycles.

Turning to FIG. 10, the roster template 1010 is associated with three cycles, cycle 1 1012, cycle 2 1013, and cycle 3 1016. The first cycle 1012 may comprise a five consecutive days, e.g., weekdays Monday-Friday. There are five corresponding day shifts, e.g., D1-D5 defined by this cycle. Each shift may have a unique or common start time, break time, and end time. The second cycle 1014 defines two shifts on the weekend, which have two corresponding day shifts, e.g., D6 and D7. Finally, the cycle 3 1016 comprises five consecutive evening shifts, E1-E5. This roster template could represent a contact center that has a day and evening shift during the week, and a day shift on the weekend. The roster template 1010 could then be associated for a given week on a calendar. By associating the agents with the cycles, and the roster template to the calendar, (or vice versa), agents can be easily and quickly associated with shifts for specific calendar days.

A roster template 1010 refers to a set of cycles which have not yet been associated with any agents. It is generic in that no specific agents are associated with it. Once one or more agents are associated to a cycle within a roster template, then it is referred to as a roster. A roster may not have all the positions filled, but has at least one agent associated with one of the cycles. Once a roster is associated with specific calendar days, then at least one agent is associated with certain days. At this point, a schedule (albeit a partial schedule) is formed.

The roster template 1010 of FIG. 10 may represent a typical workweek in a contact center. The same roster template could be reused and associated with different weeks of a month. Once agents are assigned to these different roster templates for the different weeks, each instance is a distinct roster, and to distinguish these, each is referred to as a "roster template instance." Different roster template instances could be created using the same roster template, with each roster template instance associated with different weeks. Each roster template instance may involve the same agents, or different agents.

It is possible to assign one or more roster templates in a scheduling period. For example, the roster template 1010 in FIG. 10 defines a weekday cycle comprising a day shift and another weekday cycle comprising an evening shift. It would be possible to define instead two separate roster templates, one with the weekday day shift cycle and the other with the weekday evening shift cycle. These could both be associated to the same week. However, mechanisms may be required to ensure agents assigned to one roster template are not conflicted by also being assigned to another roster template. In other words, an agent may be present in two roster template instances, which could be assigned to the same time period, but the shift times for the agent in the two roster template instances cannot overlap.

This provides flexibility as the administrator can define a first roster template that covers 80% of the scheduling needs, and then a set of special roster templates that covers 20% of the remaining scheduling needs, which represent the exceptional cases. Doing so allows the administrator to work with the first roster template most of the time, where the first roster template configured to handle normal scheduling needs.

A contact center may have a scheduling period, which is the period of time for which schedules are created. The scheduling period could be weekly, bi-weekly, monthly, quarterly, or some other time period. The roster template is usually defined taking into account the scheduling period, so that the two constructs facilitate scheduling of agents. In FIG. 10, for example, the scheduling period could be weekly or monthly. The roster template 1010 may be designed to facilitate scheduling cycles on a weekly basis, or multiples thereof. The roster template 1010 illustrated in FIG. 10 would not easily accommodate, for example, a ten-day scheduling period, since roster template is based on a weekly scheduling period with cycles encompassing either Monday-Friday or a weekend. It would be possible to define another roster template that could be used with the roster template in FIG. 10 to accommodate a ten-day scheduling period. Thus, the roster template construct is flexible enough to accommodate various scheduling needs.

Figure 11:
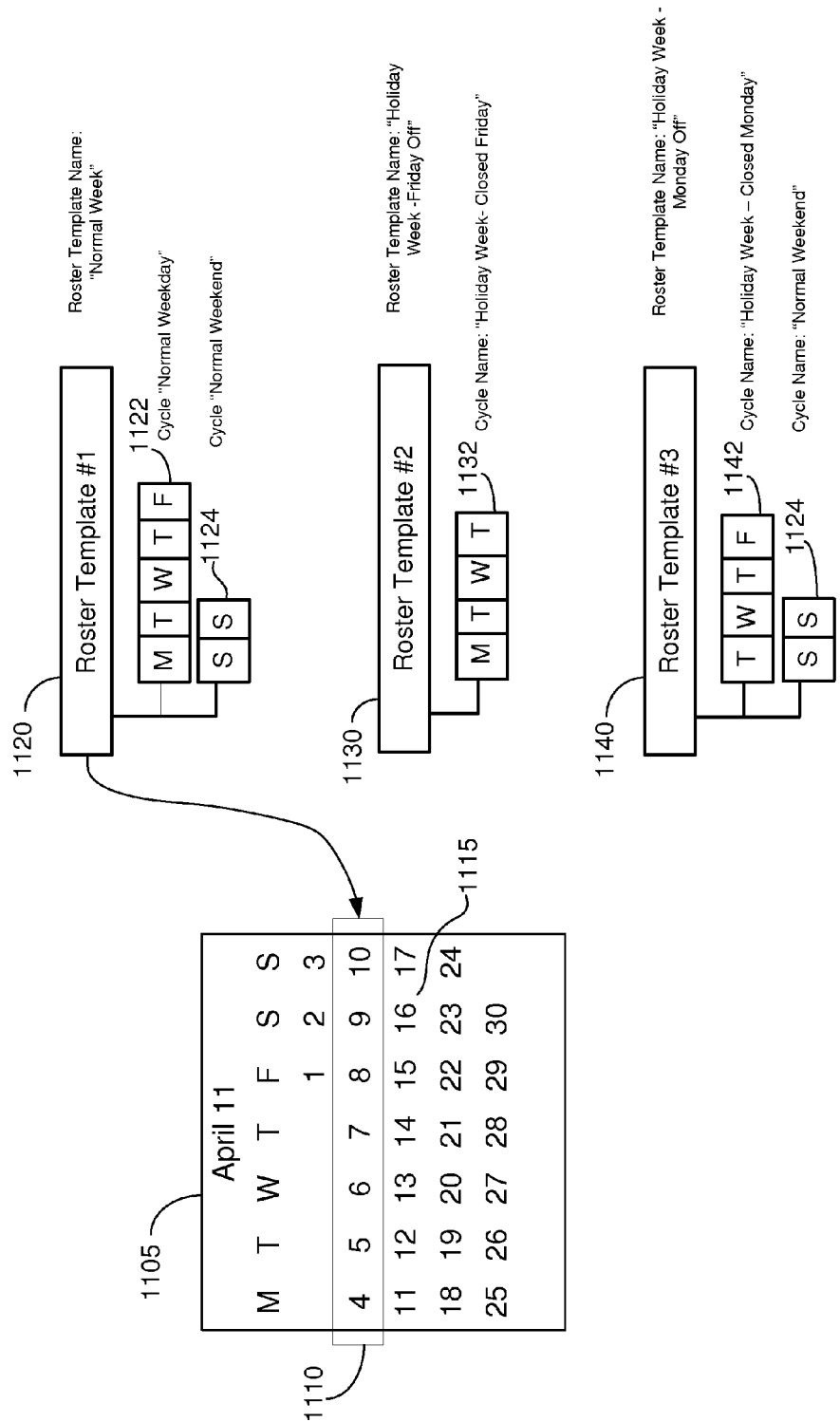
FIG. 11 illustrates an association of one of a plurality of roster templates with a calendar.

These concepts are further illustrated in another example shown in FIG. 11. In FIG. 11, a calendar 1105 for the month of April is shown, wherein scheduling is occurring for the first full week 1110. It is presumed that suitable graphical user interface tools are provided to the administrator for selecting the month and the week for which scheduling is to be performed. Noted or highlighted on the calendar is a date April. 16 1115. For purposes of illustration, this may be a date that is a recognized holiday or some other reasons for which the contact center is closed. In other embodiments, the date could represent other events that may impact work scheduling. For example, in a manufacturing plant, that day may represent a day when new equipment is scheduled for installation and hence workers are not scheduled for work.

In FIG. 11, the administrator has at their disposal three roster templates—roster template #1 1120, roster template #2 1130, and roster template #3 1140. Associated with the selected week 1110 is roster template #1 1120. This roster template may be given a name to facilitate usage. In this case, the roster template is the "normal week" roster template and comprises two cycles. The first cycle 1122 is the "normal weekday" cycle and the second cycle is the "normal weekend" cycle 1124. If there were agents associated with the roster template, then it would be a roster template instance. Typically, during the scheduling process, roster template instances are associated with the calendar before the administrator turns their attention to another roster template. In other embodiments, agents may be assigned to a roster template instance and then the roster template instance is assigned to the calendar. In this case, suitable tools maybe provided that allow the administrator to "copy and paste" the roster template instance to various weeks on the calendar to schedule a set of agents.

The association of the normal week roster template allows agents to be associated with the shifts for that week. In other embodiments, the agents may be associated with the roster template and the roster template instance is then associated with the selected week 1110.

The following week on the calendar 1105 includes the Friday, April 16th 1115 that is a holiday, so the normal week roster template would not be appropriate to associate with that week. For this, a holiday roster template may be used. There may be several holiday roster templates defined. For example, many federal holidays occur on a Monday or Friday. To accommodate this common situation, roster template #2 1130 may be defined. This roster template is defined as "holiday week-Friday off" and has a cycle comprising shifts for Monday-Thursday, but not Friday. Further, there is no weekend shift, which may reflect the company's policy of closing the center when there is a Friday holiday. Another roster template, roster template #3 1140 may be defined that accommodates a Monday holiday. In roster template #3, there are two cycles, one cycle 1142 for a four day work week Tuesday-Friday, and a normal weekend cycle 1124. This arrangement may accommodate a contact center that remains open on the weekend if the holiday is on a Monday.

Thus, for the week beginning April 1, which represents a four day work week with Friday as a holiday, the "holiday week-Friday off" roster template #2 1130 would be suitable to use. It is possible to then develop a library of commonly used roster templates to meet the various scheduling constraints that will occur during various scheduling periods throughout the year. Further, customized roster templates could be defined with cycles that could accommodate special circumstances, including agents with special scheduling needs. For example, an agent may require a unique cycle with unusual shifts. This unique work arrangement could be created and associated with a new roster template just for that agent.

Figure 12:
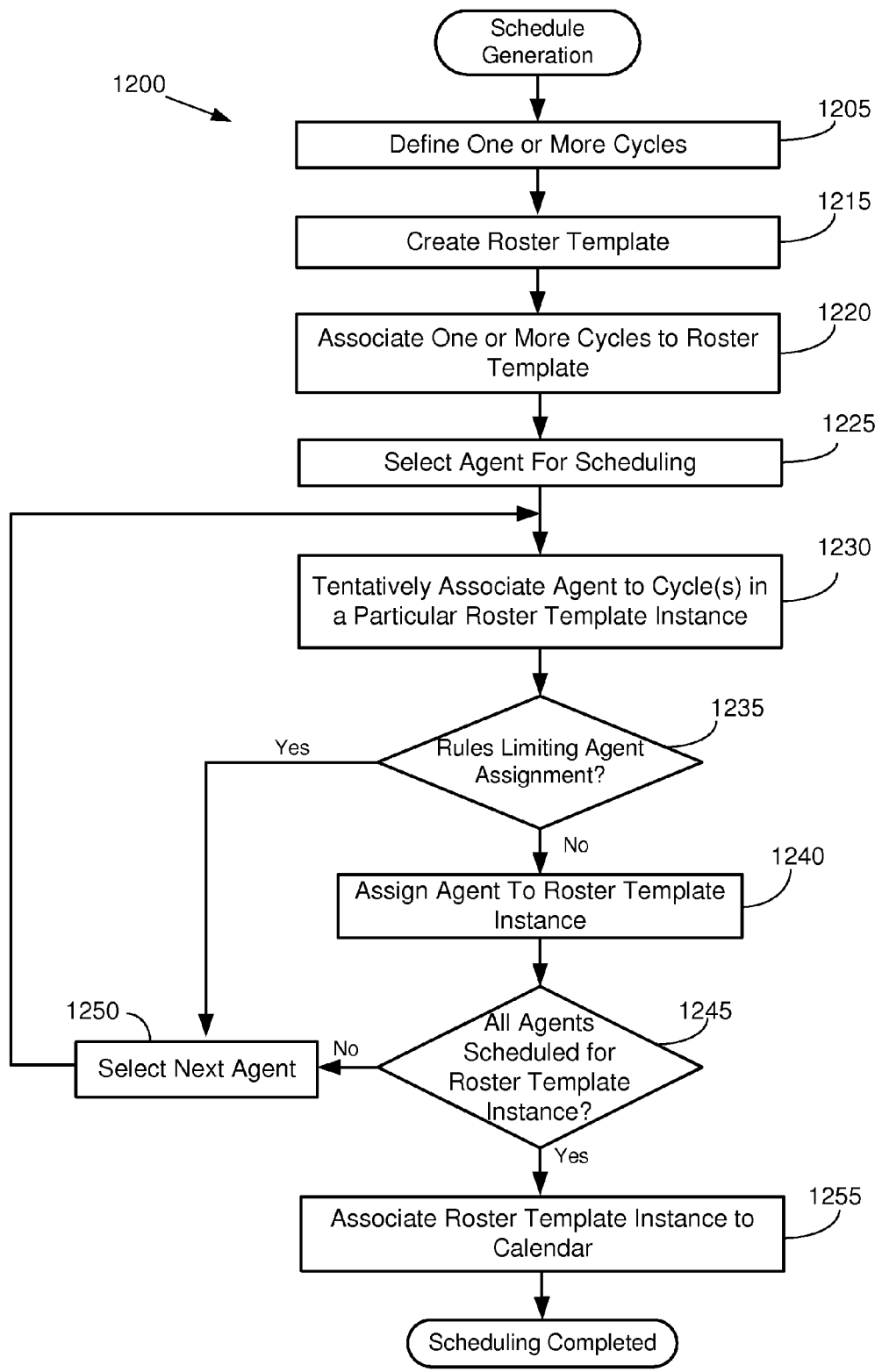
FIG. 12 illustrates a process flow for creating a schedule.

A process flow that can be used to describe generating a schedule is shown in FIG. 12. The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Returning to FIG. 12, the process flow 1200 begins with defining one or more cycles in operation 1205. This may involve defining the start/stop times, break times, which campaign the shifts are associated with, what skill levels are required, etc. These may be defined individually for each shift, or a set of attributes may be applied to each shift. In some embodiments, each cycle may be given a name that is descriptive of its purpose or application.

Next, a roster template is created in operation 1215. The roster template may also have a name descriptive of its intended application. Next, the particular cycles are associated with the roster template in operation 1220. At this point, no agents are associated with the roster template or the cycles. Various graphical users interface tools may be defined where a user can select one or more cycles from a library to create the roster template. In other embodiments, an existing roster template may be edited and renamed to create a new roster template. A library of roster templates may exist, and after an initial set of roster templates is generated, it is expected that newer roster templates will not be required.

Next, an agent or set of agents can be selected for scheduling in operation 1225. This can be done manually by the administrator or in an automated manner by a scheduling program. Agents can be identified individually or by selecting a group of agents. The selected agent(s) is then tentatively associated with a cycle in the roster template. Note that once an agent is assigned, the roster template may be more referred to as a roster template instance.

The association of agents to the roster template is tentative, since there may be various rules defined associated with the cycle, the agent, and the roster template. Depending on the rule, it may not be possible to assign the selected agent to the cycle. For example, the agent may have a rule associated with them that they cannot work evenings. If the cycle includes one or more evening shifts, it may be prohibited for the agent to be assigned to the cycle in that roster template. Thus, if there are any rules limiting the agent's assignment to the cycle in operation 1235, the next agent is selected in operation 1250 and the process repeats. Suitable user interface warnings can be presented indicating that a rule prevents such association or that the roster template causes a rule to be violated.

If, however, there are no rules limiting the agent's assignment to the cycle, then the agent is assigned to the roster template and the roster template instance is formed in operation 1240. Next, a test is performed in operation 1245 to see of all agents have been scheduled. If not, then the next agent is selected in operation 1250 and the process repeats.

The determination of whether all the necessary agents have been scheduled may be determined in different ways. In some contact centers, all the agents will be scheduled. These may be regular full time or part time employees that work each week. In other embodiments, there may be a large pool of employees, and only those that are needed are scheduled. In this case, a determination that the desired number of shifts have been filled may be the basis for ceasing the assignment of agents to the roster template instance.

Once the roster template instance is completed, then in operation 1255 the roster template may be associated with a calendar (e.g., a specific set of days). This maps specific days to the shifts in each cycle, typically based on the day of the week that each shift in a cycle is associated with. In other embodiments, the roster template can be associated with calendar dates prior to associating the agents with the cycles.

In other embodiments, the roster template instance could be copied and pasted into another week on the calendar. In other embodiments, the roster template is associated with the calendar first, and then agents are associated with the roster template. Once completed, the roster template (which is then more accurately referred to as a roster template instance) could be copied and pasted into other weeks on the calendar.

Figure 13:
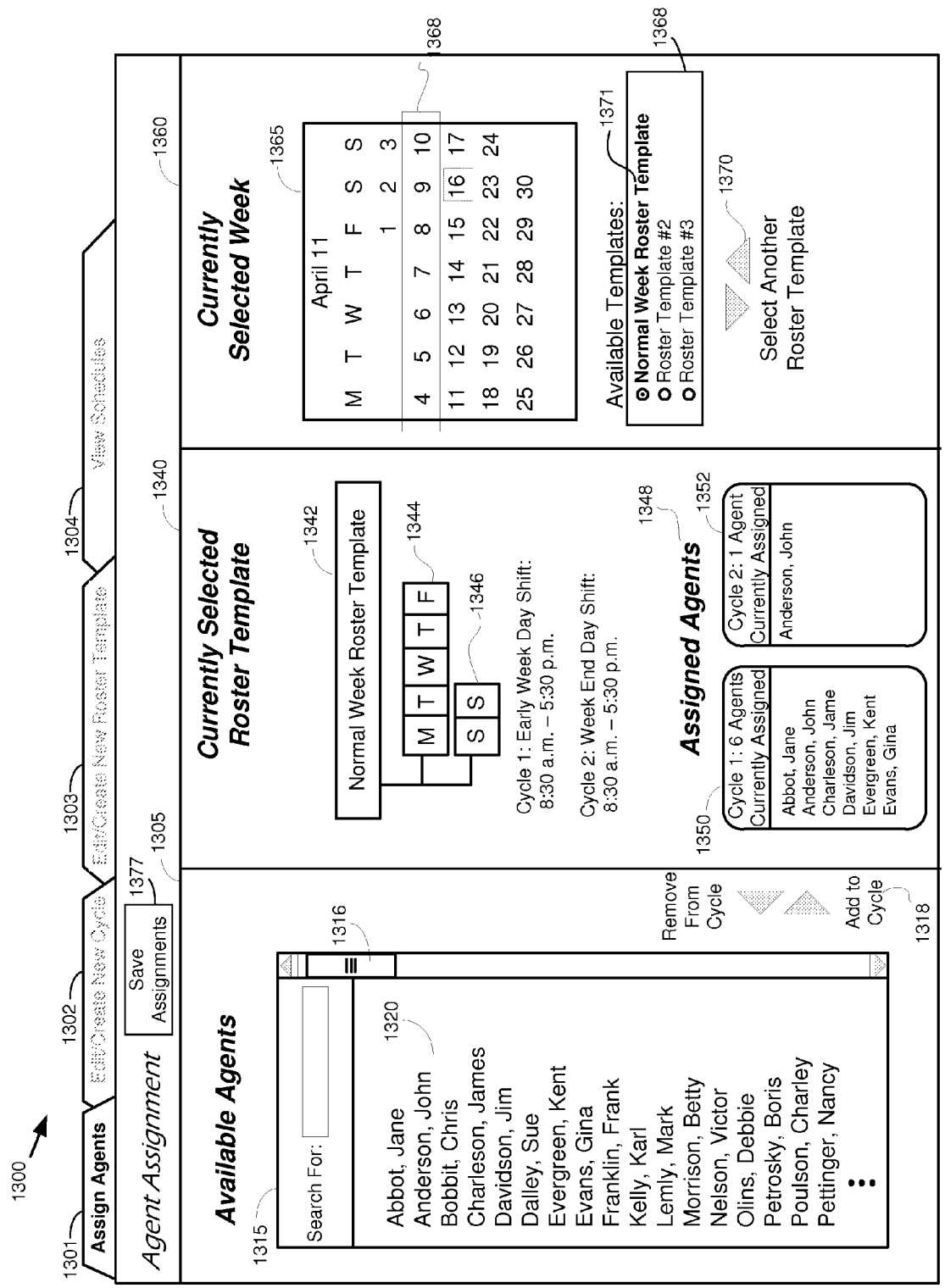
FIG. 13 illustrates one embodiment of a graphical user interface for assigning agents to a roster template.

FIG. 13 illustrates one screen display 1300 of a graphical user interface ("GUI") that may be used by a contact center administrator to schedule agents. The screen display 1300 provides a plurality of function tabs 1301-1304 for performing various functions associated with the process. For example, prior to assigning agents which is associated with a function tab 1301, the administrator may have selected a function tab 1302 to create various cycles. These may be generated anew or by editing and modifying an existing cycle. Another function tab 1303 may be used to create roster templates. As with the cycles, these may be named and have various attributes associated with them. Finally, another function tab 1304 may be used to view completed schedules. Additional tabs may be used to define shifts that are used in cycles, modify/add to the rules for checking agent assignments, view draft schedules, etc.

The display screen 1300 is shown in this embodiment as having three main panels 1305, 1340, and 1360. The order in which these panels are presented and the order in which the associated operations may occur can vary in different embodiments. In this embodiment, the administrator may start out in the right-most panel 1360 by selecting a particular week on a calendar 1365 for which scheduling is to occur. This calendar 1365 reflects the same month as shown previously in FIG. 11, with a holiday indicated on Friday, April 16, which is the following week. The administrator may be able to use a pointing device, such as a mouse, to select and move a selector 1368 that indicates the desired week.

A roster template selection box 1368 indicates a set of available roster templates that are currently defined. Control icons 1370 may be provided to scroll up or down, and/or a radio button may be available to select a particular roster template. The available roster templates are shown by their assigned name, and the bold text indicates that the "Normal Weekday Roster Template" 1371 has been selected.

Once the administrator selects a template roster from the roster template selection box 1368, the corresponding roster template structure is shown in the middle pane 1340. Specifically, the selected roster template 1342 is shown with the corresponding cycles, cycle 1 1344 and cycle 2 1346. Thus, the administrator is visually presented with the cycles and the corresponding shifts for each day of the week associated with the template roster. In this example, the normal week template roster includes two cycles. Additional details of each cycle maybe presented. In this illustration, only the first letter of the corresponding day of the week is shown. For example, the first cycle 1344 indicates shifts for "M", "T", "W", "T", and "F" covering Monday-Friday, and each shift lasts from 8:30 a.m.-5:30 p.m. Further information could be provided for a selected shift in a cycle, such as break times, skill levels, etc. by selecting the cycle with the mouse. Cycle 2 1346 covers Saturday and Sunday and the corresponding shifts involves the same times.

The middle pane 1340 also has a section 1348 indicating which agents have been assigned to which cycles. Specifically, agent assignment boxes 1350 and 1352, correspond to cycle 1 and cycle 2 respectively and indicate the currently assigned agents to each cycle. For example, presently, there are six agents assigned to cycle 1 as indicated in the cycle 1 assignment box 1350. Further, there is a single agent assigned to cycle 2 as indicated in the cycle 2 assignment box 1352. Thus, the middle pane 1340 allows the administrator to quickly review what cycles are involved with the selected roster template and what agents are associated with each cycle.

The left-most pane 1305 is used for selecting agents and associating them with a cycle. The selection box 1315 lists the names 1320 of the available agents. A scroll icon 1316 allows viewing a large list of names. One or more agents can be selected by using a mouse device, and using various controls 1318, the agent(s) can be associated with a cycle. Agents can be selected in the agent assignment box 1350 and removed as well. Other well known mechanisms, such as dragging and dropping, can be used to assign one or more agents.

Mechanisms can be defined to allow selection of a team of agents to a cycle. If the number of agents is quite large, then selection of agents can be facilitated by defining groups of agents as teams. A team designation or a team leader may involve a plurality of agents so that a single action can assign the entire team comprising a group of agents. Further, mechanisms can be defined to indicate how many agents are needed to fill a particular cycle. This allows the administrator to properly fill a roster template with the required number of agents. It is also possible to copy and assign a large group of agents to a cycle, and then use controls to selectively remove agents.

Once all the agents to be assigned are associated with the roster template, a save function 1377 may be invoked to store the association. At this point, the agent can work on another roster template, edit or review another roster template instance, etc. It should be evident that a variety of tools could be designed for allowing a user to easily select agents, cycles, roster templates and associate them to calendar dates within a scheduling period.

Automatic Selection of Agents

The process described in conjunction with FIG. 13 is a largely manual process wherein the administrator manual selects the roster template to use, manually associates it with a calendar week, and manually selects and assigns the agents to the cycles of the roster template.

In other embodiments, portions of the process may be automated. For example, returning to the example associated with FIG. 13, the administrator may be generating schedules for the upcoming year on a weekly basis. It may be that administrator requests that the system automatically associate agents on a rotating basis to the weekend day shift for the upcoming year. This can use the point-allocation scheme discussed previously, wherein points are associated with each agent being assigned to the undesirable shifts. Thus, the administrator may manually complete one cycle and request that the system automatically complete another cycle.

This requires that the system provide the appropriate mechanisms allowing the administrator to establish the appropriate point values and starting values. The system may generate and present a rotation pattern similar as depicted in previous figures to allow the administrator to review the assignment patterns. This could be accomplished using a wizard program that gathers from the user the relevant inputs and in response guides the user though the various options. It is possible that preliminary views of the schedules, similar to as shown in FIGS. 9A-9E are shown to the administrator before finalizing the agent schedules.

Rule Checking

Whenever an agent is associated with a cycle, a check may be performed using various rules to determine if the agent can be assigned to the cycle(s) as indicated. Rules may be defined at various levels, such as at a contact center level, campaign level, or agent level. Contact center level rules are rules that are applied to all agents, and may attempt to prevent violations of applicable contact center policies, employment regulations, or contract provisions. Campaign level rules apply only to that campaign, and may specify, e.g., what type agent skills are needed. Finally, agent level rules are rules that are unique to an agent.

For example, returning to FIG. 13, an error message may be provided to the administrator upon associating the agent "Anderson, John" as shown in the assigned agents display box 1352. This is because John Anderson is already assigned for cycle 1 as shown in the cycle 1 assignment box 1350. Recall that cycle 1 1344 involves working the day shift from Monday-Friday, and that cycle 2 1346 involves working the day shift Saturday and Sunday. The system may determine that working seven consecutive days is prohibited, and may refuse to associate John Anderson to cycle 2 unless he is removed from cycle 1. There are a host of labor regulations that can be checked when scheduling agents, including a maximum number of consecutive hours worked, maximum number of consecutive days worked, etc.

Some rules that may be checked, include:
Ensuring that hours worked during a time period does not exceed a limit (e.g., 40 hours/week).
Ensure that adequate time occurs between shifts.
Ensure that roster templates are associated with at least one agent.
Ensure that agent's skills matches required attributes for the assigned cycle.
Ensure that scheduled vacation, leave, or time-off requests are considered.

Each of these rules may have guidelines indicating how an exception to the rule should be treated. For example, a "hard" rule would indicate that the rule must be followed in each case. A "warning" may be issued with explicit acknowledgement from the administrator that the rule may be overridden. Other indications may simply inform the administrator without requiring any specific authorization actions.

The system may also check that the roster template associated with a given calendar week is correct. For example, holidays for the applicable country may be noted on the calendar, and a roster template indicating a cycle that has a shift on a holiday may also result in an error message. For example, returning to FIG. 13, if the normal week roster template was selected for the following week in the calendar 1365, then there would be Friday day shift scheduled for April 16, which is designated as a holiday. This would be reported as an error to the administrator, and a prompt to select another roster template would be provided.

Agent/Call Handler/WFM Messaging Interaction

Once the WFM generates the schedules as described above, the schedule information may be used in conjunction with processing agent login information. The agent typically logs into the call handler, which informs the call handler that the agent is present. The agent login information is then compared against the scheduled generated for that agent. If the agent is scheduled, then the agent may be allowed to log in and receive calls after logging in. In various embodiments, the agent may be precluded from logging in if they are not scheduled to work. Or, the agent may be allowed to login even though they are not scheduled, and a supervisor may be informed of the anomaly.

This involves comparing information about the agent logging in and the agent schedule. As will be seen, this can be done by the WFM, which generates the agent schedule, or by the call handler. If done by the call handler, the WFM sends the schedule information to the call handler so that it can perform the comparison.

Figure 14A:
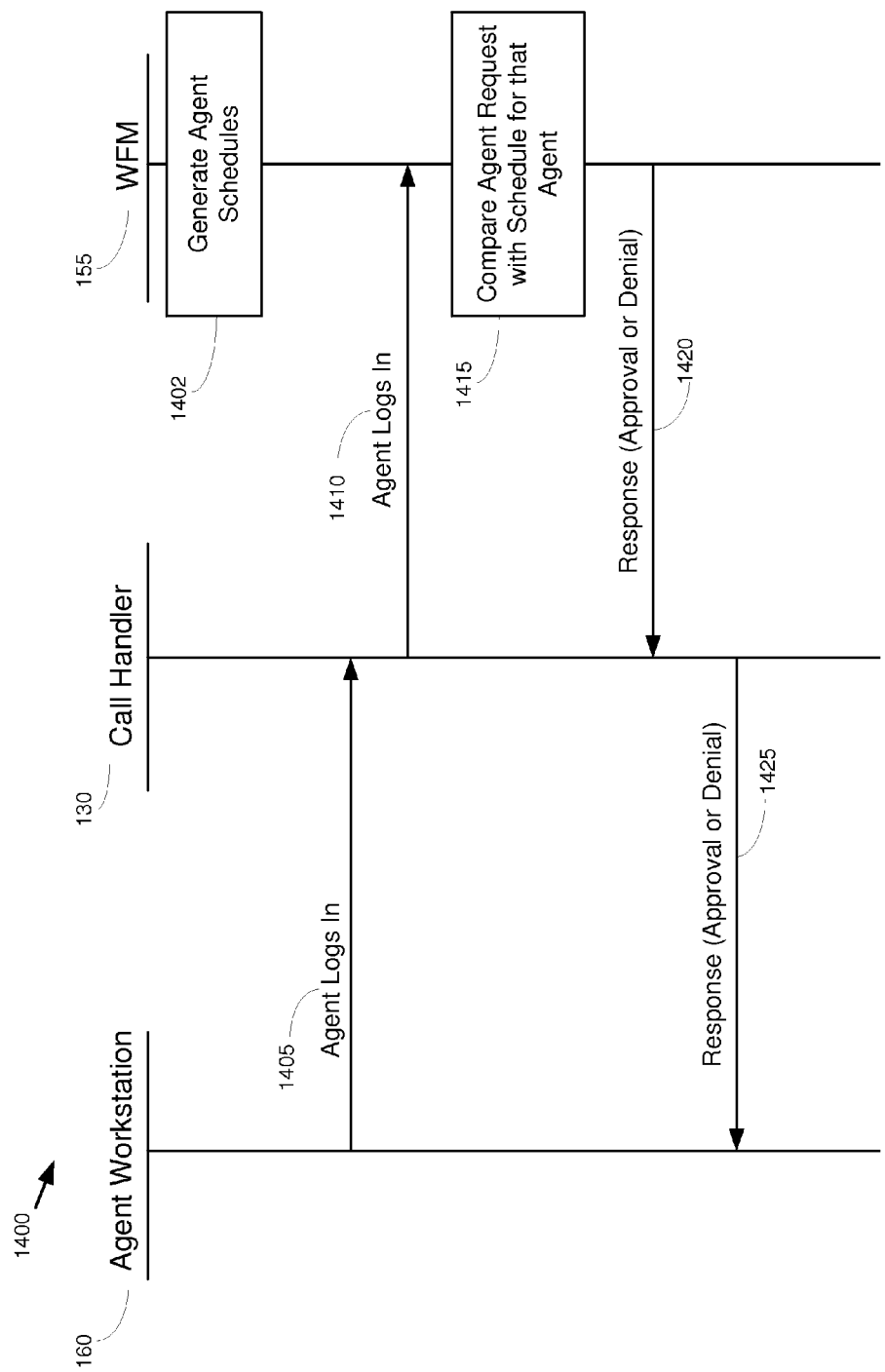
FIGS. 14A-14B illustrate embodiments of messaging flows relating to an agent logging into the call handler.

Turning to FIG. 14A, an embodiment of the message flow 1400 between the agent's workstation, the call handler, and the WFM is shown. In this embodiment, the comparison of the agent login request with the schedule is performed by the WFM. The process is predicated on the WFM 155 generating a schedule in operation 1402 as described above. Once this is completed, then there is a framework to then compare a login request with a schedule when an agent logs in.

At some point later in time, which may be several minutes or days later, an agent interacts with the agent workstation by logging into the system. This results in the agent workstation 160 sending an agent login message 1405 to the call handler 130. The call handler passes the message 1410 to the WFM 155. Once the WFM receives this message, it can then determine based on the schedule previously generated whether the agent is authorized to work in operation 1415. This can be easily accomplished by accessing the schedule based on the current date and time to determine whether the requesting agent is listed in the schedule at that time.

Once the WFM has completed this operation, a response message 1420 is provided back to the call handler 130, which may either approve or deny the agent from logging into the call handler. The call handler, in turn, will send a notification message 1425 to the agent workstation 160 reporting whether the agent is authorized to log into the system or not. In other embodiments, the WFM 155 may merely acknowledge the login request to the call handler, allowing the agent to log on even though not scheduled. In such cases, the WFM or call handler may send a notification to a supervisor reporting the unexpected agent login.

Once the agent is authorized to log on, the call handler 130 then may direct instances of communication (either outbound or inbound) to the agent. Specifically, once the login occurs, the agent may receive voice calls or other forms of communication. Conversely, if the agent is not authorized to log into the call handler, no calls are directed to the agent. Thus, the WFM, in this embodiment, determines whether the agent is scheduled to work based on the schedule generated and informs the call handler as to whether calls may be offered to the agent.

Figure 14B:
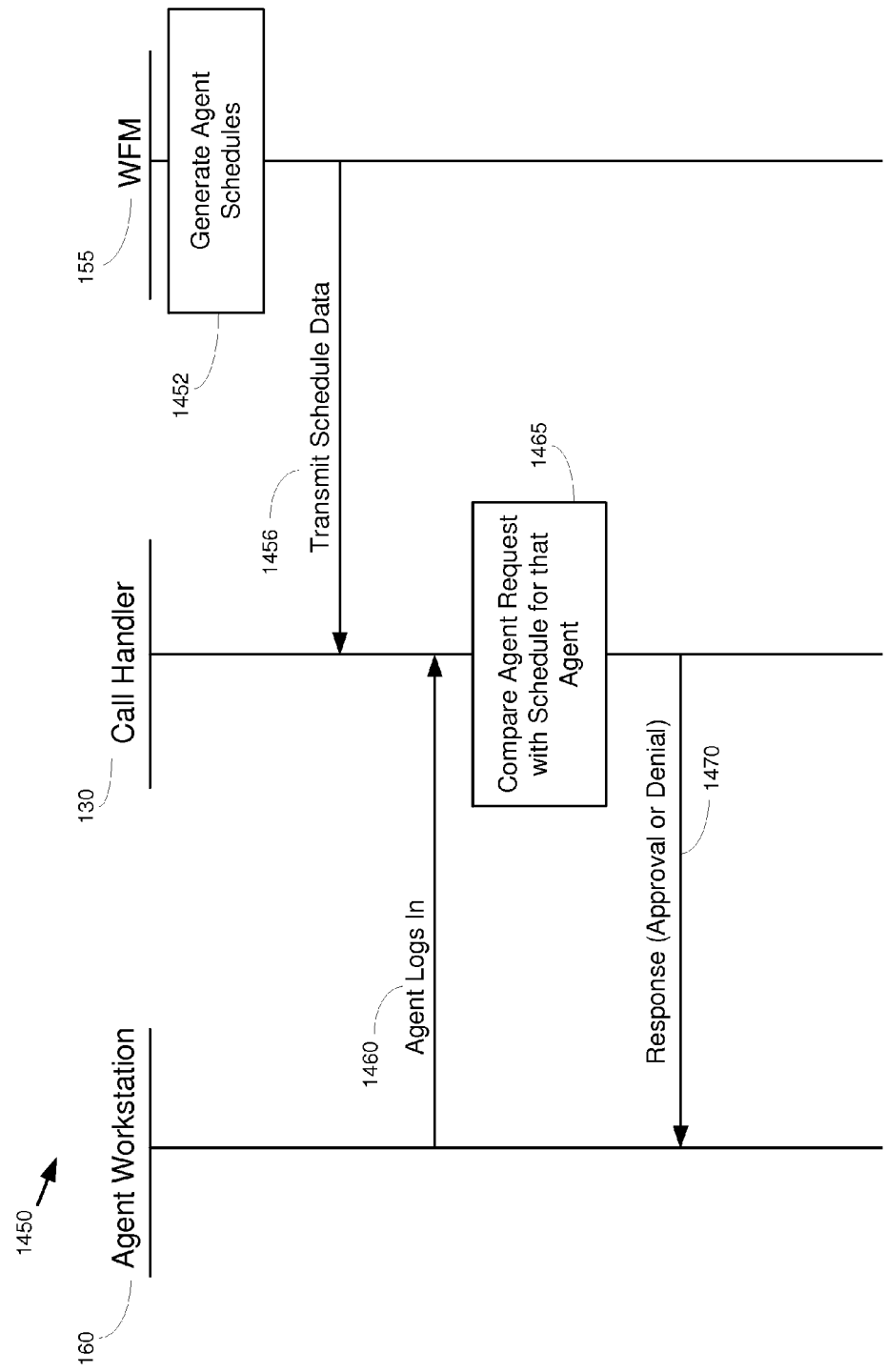

FIG. 14B illustrates another embodiment wherein the comparison of the agent login information is compared with the generated agent schedule in the call handler. In this message flow 1450, the WFM 155 generates the agent schedule as previously described in operation 1452. Next, the WFM 155 transfers the schedule information to the call handler 130 in message 1456. This may be done on a periodic basis. For example, every week a new agent schedule may be generated and downloaded to the call handler. Or, daily updates or subsets of a schedule may be sent to the call handler.

In any case, the call handler has the schedule information when the agent logs in and the agent login information is sent in message 1460. The call handler 130 then compares the login request with the agent schedule information in operation 1465. The call handler then provides a response to the agent in message 1470 either approving or denying the login.

In other embodiments, the call handler may allow the agent to login, and send a notification to a supervisor if the agent is not scheduled to work.

Exemplary Processing Device Architecture

Figure 15:
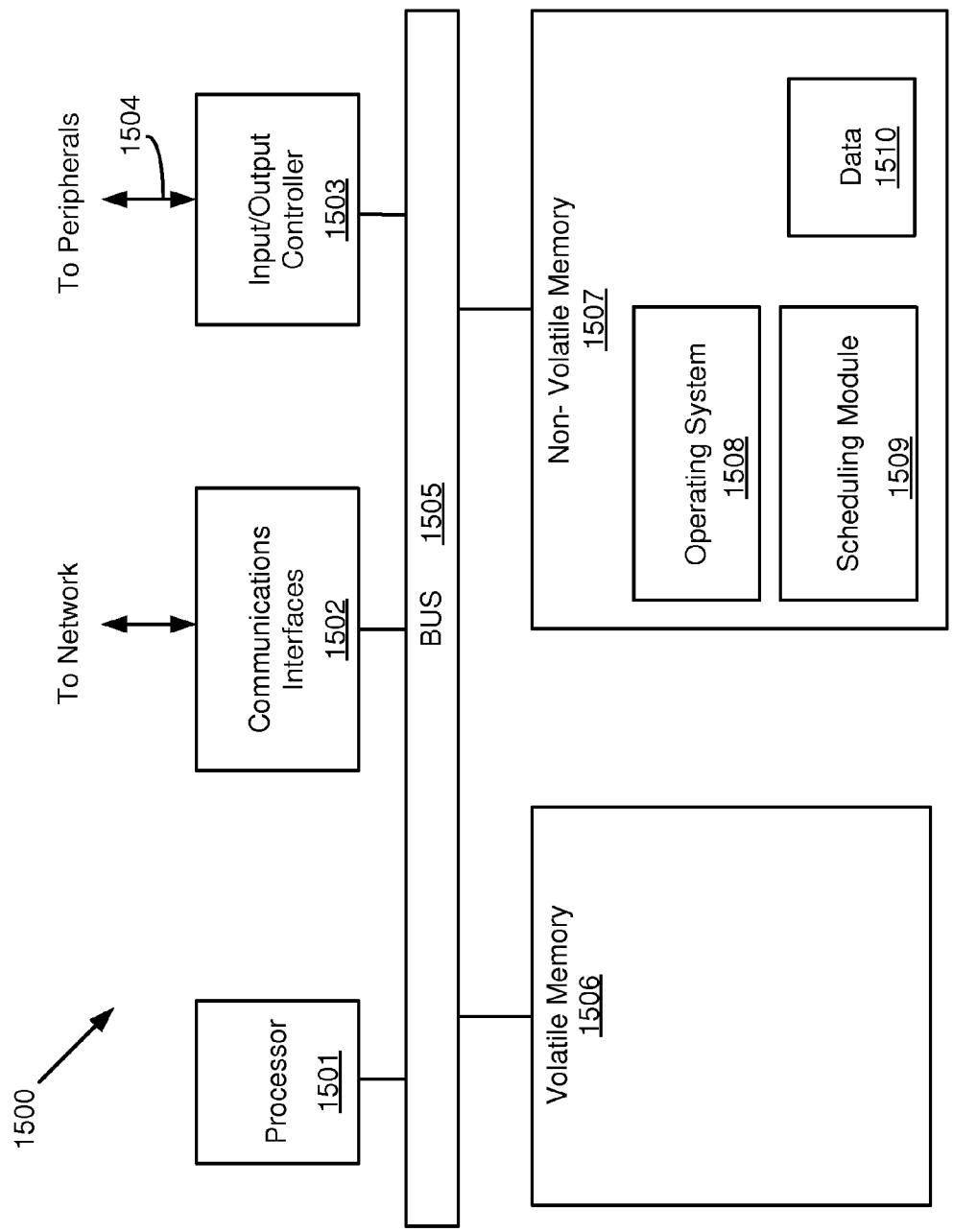
FIG. 15 illustrates one embodiment of a processing system for implementing the concepts and technologies disclosed herein.

As discussed in conjunction with FIG. 1, the contact center architecture 100 may comprise various components that comprise a processing system. FIG. 15 is an exemplary schematic diagram of a processing system 1500 that may be used in an embodiment to practice the technologies disclosed herein. This could represent the call handler which is configured to direct instances of communication to an agent in response to determining that the agent is scheduled to work relative to the agent schedule. This could also represent the WFM that generates the agent schedule. Specifically, this system could be implemented as a software module executing in the computer of the agent's workstation, the call handler, and/or the WFM (or in a distributed manner involving multiple components). In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 15, the processing system 1500 may include one or more processors 1501 that may communicate with other elements within the processing system 1500 via a bus 1505. The processor 1501 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1500 may also include one or more communications interfaces 1502 for communicating data via the local network with various external devices, such as other components of FIG. 1. This interface may be used to receive agent login information from a call handler as well as transmit the results of comparing login information for an agent with the schedule. The interface could also be used to transfer schedule information to the call handler in embodiments where the call handler determines whether the agent is currently scheduled to work upon receiving a login request. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1503 may also communicate with one or more input devices or peripherals using an interface 1504, such as, but not limited to: a keyboard, a mouse, a touch screen/display input, microphone, pointing device, etc. The input/output controller 1503 may also communicate with output devices or peripherals, such as displays, printers, speakers, headsets, banner displays, etc.

The processor 1501 may be configured to execute instructions stored in volatile memory 1506, non-volatile memory 1507, or other forms of computer-readable storage media accessible to the processor 1501. The volatile memory 1506 may comprise various types of memory technologies, including, but not limited to: random access memory ("RAM"), dynamic random access memory ("DRAM"), static random access memory ("SRAM"), and other forms well known to those skilled in the art. The non-volatile memory 1507 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1507 may store program code and data, which also may be loaded into the volatile memory 1506 at execution time. Specifically, the non-volatile memory 1507 may store one or more computer program modules, such as a scheduling module 1509, and related data 1510, and/or operating system code 1508 containing instructions for performing the process and/or functions associated with the technologies disclosed herein. In addition, the scheduling module 1509 generate or access the data 1510 in the non-volatile memory 1507, as well as in the volatile memory 1506. The volatile memory 1506 and/or non-volatile memory 1507 may be used to store other information including, but not limited to: records, applications, programs, scripts, source code, object code, byte code, compiled code, interpreted code, machine code, executable instructions, or the like. These may be executed or processed by, for example, the processor 1501. These may form a part of, or may interact with, the scheduling module 1509 and/or event data 1510.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such tangible, non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for scheduling agents in a contact center using a computer comprising:
- receiving a first input from a user at the computer defining a cycle, wherein the cycle comprises one or more shifts, wherein each shift is associated with a shift starting time, a shift ending time, and one or more shift breaks, wherein each shift break is associated with a shift break start and end time, and wherein each shift is associated with a day of a week;
- defining a roster template by using the computer, the roster template comprising one or more cycles, and wherein the roster template covers one or more days;
- associating an agent to a particular cycle of the one or more cycles by the computer based on a second input from the user, thereby creating a roster template instance stored in the computer;
- associating, by the computer, the roster template instance to a specified one or more days of a calendar in a scheduling period; and
- associating the roster template instance to another specified one or more days of the calendar during the scheduling period by the computer, wherein the another specified one or more days does not overlap with the specified one or more days, thereby scheduling the agent by the computer to work on corresponding shifts of the particular cycle on the specified one or more days and the another specified one or more days;
- receiving input from a call handler, the input identifying the agent logging into the call handler;
- determining the agent is scheduled to work; and
- providing a message to the call handler indicating the agent is scheduled to work, wherein the call handler is configured to direct a voice call to a workstation used by the agent.

2. The method of claim 1, further comprising the steps of:
- associating another agent to the particular cycle in the roster template instance by the computer, thereby scheduling the another agent for the specified one or more days and the another specified one or more days.

3. The method of claim 1, wherein associating another agent to the particular cycle schedules the another agent to work for each shift of the particular cycle during the scheduling period.

4. The method of claim 3, further comprising the steps of:
- selecting the another agent for a different cycle based on comparing respective point values of the another agent and the agent, wherein the respective point values are based on previously assigned shifts of the another agent and the agent.

5. The method of claim 4, wherein the roster template comprises a second cycle comprising a weekend shift.

6. The method of claim 1, wherein the particular cycle comprises five contiguous days corresponding to Monday through Friday.

7. The method of claim 1 wherein the another specified one or more days is contiguous with the specified one or more days.

8. The method of claim 1, further comprising:
- allocating one or more points to the agent for each shift in the particular cycle in the roster template instance; and
- using an accumulated value of the one or more points to determine whether to associate the agent to another cycle in the scheduling period.

9. The method of claim 1, wherein the cycle comprises more than one shift and the roster template covers more than one day.

10. A computer-readable non-transitory medium storing instructions that when executed by a processor cause the processor to:
- receive a first input from a user defining a cycle, wherein the cycle comprises one or more shifts, wherein each shift is associated with a shift starting time, a shift ending time, and one or more shift breaks, wherein each shift break is associated with a shift break start and end time, and wherein each shift is associated with a day of a week;
- receive a second input from the user defining a roster template, the roster template comprising one or more cycles, and wherein the roster template covers one or more days;
- associating an agent to a particular cycle of the one or more cycles based on a third input from the user, thereby creating a roster template instance stored in a memory;
- associating the roster template instance to a specified one or more days of a calendar in a scheduling period;
- associating the roster template instance to another specified one or more days of the calendar during the scheduling period, wherein the another specified one or more days does not overlap with the specified one or more days, thereby scheduling the agent to work on corresponding shifts of the particular cycle on the specified one or more days and the another specified one or more days;
- receive a login request from a call handler, the login request identifying the agent;
- determine the agent is currently scheduled to work; and
- authorize the call handler to direct a voice call to a workstation used by the agent.

11. The computer-readable non-transitory medium of claim 10, further comprising instructions that when executed cause the processor to:
- associate another agent to the particular cycle in the roster template instance, thereby scheduling the another agent for the specified one or more days and the another specified one or more days.

12. The computer-readable non-transitory medium of claim 10, further comprising instructions that when executed cause the processor to:
- associate another agent to the particular cycle, thereby scheduling the agent to work for each shift of the particular cycle during the scheduling period.

13. The computer-readable non-transitory medium of claim 10, further comprising instructions that when executed cause the processor to:
- allocate one or more points to the agent for each shift in the particular cycle in the roster template instance; and
- use an accumulated value of the one or more points allocated to the agent to determine whether to associate the agent to another cycle during the scheduling period.

14. The computer-readable non-transitory medium of claim 10, further comprising instructions that when executed cause the processor to:
- select another agent for a different cycle based on comparing respective point values of the another agent and the agent, wherein the respective point values are based on previously assigned shifts of the another agent and the agent.

15. The computer-readable non-transitory medium of claim 10, wherein the particular cycle comprises five contiguous days corresponding to Monday through Friday.

16. The computer-readable non-transitory medium of claim 10, wherein the roster template comprises a second cycle comprising a weekend shift.

17. The computer-readable non-transitory medium of claim 10, wherein the another specified one or more days is contiguous with the specified one or more days.

18. The computer-readable non-transitory medium of claim 10, wherein the cycle comprises more than one shift and the roster template covers more than one day.

19. A system for scheduling workers over a scheduling period, comprising:
a workforce management component comprising a first processor configured to:
receive a first input from a user defining a cycle, wherein the cycle comprises one or more shifts, wherein each shift is associated with a shift starting time, a shift ending time, and one or more shift breaks, wherein each shift break is associated with a shift break start and end time, and wherein each shift is associated with a day of a week,
define a roster template, the roster template comprising one or more cycles, and wherein the roster template covers one or more days,
associate an agent to a particular cycle of the one or more cycles based on a second input from the user, thereby creating a roster template instance stored in the computer,
associate the roster template instance to a specified one or more days of a calendar in a scheduling period, and
associate the roster template instance to another specified one or more days of the calendar during the scheduling period by the computer, wherein the another specified one or more days does not overlap with the specified one or more days, thereby scheduling the agent to work on corresponding shifts of the particular cycle on the specified one or more days and the another specified one or more days, and
determine the agent is scheduled to work in response to receiving a login request; and
a call handler comprising a second processor configured to:
transmit the login request to the workforce management component,
receive a response from the workforce management component indicating the agent is scheduled to work, and
direct a voice call to a workstation used by the agent in response to receiving the response from the workforce management component indicating the agent is scheduled to work.

20. The system of claim 19, wherein a score is associated with the agent based on associating the agent to the particular cycle, and the score is used to associate the roster template instance to the another specified one or more days.

21. The system of claim 19, wherein the roster template comprises a first cycle and a second cycle, wherein the first cycle reflects one or more weekday shifts and the second cycle reflects one or more weekend shifts.

22. The system of claim 19, wherein a second agent is associated with the particular cycle thereby scheduling the second agent to the specified one or more days.

* * * * *